US011093597B2

(12) United States Patent
Pantfoerder et al.

(10) Patent No.: US 11,093,597 B2
(45) Date of Patent: Aug. 17, 2021

(54) IDENTITY CREDENTIAL VERIFICATION TECHNIQUES

(71) Applicant: Apple Inc., Cupertino, CA (US)

(72) Inventors: Achim Pantfoerder, Los Altos, CA (US); Daniel R. Borges, San Francisco, CA (US); Irene M. Graff, Cupertino, CA (US); Johan O. Bergerengen, San Francisco, CA (US); Subash Marri Sridhar, San Jose, CA (US); Thomas Elliott, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 149 days.

(21) Appl. No.: 16/122,321

(22) Filed: Sep. 5, 2018

(65) Prior Publication Data

US 2019/0325125 A1  Oct. 24, 2019

Related U.S. Application Data

(60) Provisional application No. 62/662,178, filed on Apr. 24, 2018.

(51) Int. Cl.
*G06F 21/33* (2013.01)
*G06F 21/62* (2013.01)
*H04L 9/30* (2006.01)

(52) U.S. Cl.
CPC .......... *G06F 21/33* (2013.01); *G06F 21/6245* (2013.01); *H04L 9/30* (2013.01)

(58) Field of Classification Search
CPC ...... G06F 21/33; G06F 21/6245; G06F 21/44; G06F 21/32; H04W 8/005; H04W 4/80;
(Continued)

(56) References Cited

U.S. PATENT DOCUMENTS 9,544,001 B1 *  1/2017  Aldereguia ............ H04W 4/90
2015/0113616 A1  4/2015  Sampas
(Continued)

FOREIGN PATENT DOCUMENTS

WO    2016/161272 A1   6/2016
WO    2016161272 A1    10/2016

OTHER PUBLICATIONS

Patrick Murphy et al."Using Bluetooth for Short-Term Ad Hoc Connections Between Moving Vehicles: A Feasibility Study," IEEE, 2002, pp. 414-418, (Year: 2002).*
(Continued)

*Primary Examiner* — Luu T Pham
*Assistant Examiner* — Canh Le
(74) *Attorney, Agent, or Firm* — Kilpatrick Townsend & Stockton LLP

(57) ABSTRACT

Embodiments of the present disclosure are directed to, among other things, improving data security with respect to data collection, verification, and authentication techniques associated with obtaining and transmitting identity information. For example, an identification credential may be received (e.g., via a short-range communications protocol such as iBeacon) by a first device from a second device. The credential may be associated with a second user of the second device. The first device may verify the credential and, if valid, an additional option to approve a secure communications channel may be presented at the first device. If the additional option is selected, a secure communications channel may be established between the first device and the second device.

19 Claims, 10 Drawing Sheets

(58) Field of Classification Search
CPC .... H04W 12/003; H04L 63/0823; H04L 9/30; H04L 63/0492; H04L 2209/84; H04L 2209/80; H04L 9/3268; H04L 9/3228
See application file for complete search history.

(56) References Cited

U.S. PATENT DOCUMENTS

| | | | |
|---|---|---|---|
| 2015/0312353 A1 | 10/2015 | Chen et al. | |
| 2016/0014250 A1 | 1/2016 | Basir | |
| 2016/0072872 A1* | 3/2016 | Li | H04L 67/025 715/740 |
| 2016/0127900 A1 | 5/2016 | Archibald et al. | |
| 2016/0294831 A1 | 10/2016 | Borunda et al. | |
| 2017/0164178 A1 | 6/2017 | Anjum et al. | |
| 2017/0193828 A1* | 7/2017 | Holtzman | G06Q 50/30 |
| 2017/0208564 A1* | 7/2017 | Lee | H04W 4/80 |
| 2018/0012324 A1* | 1/2018 | Kelts | G06Q 30/018 |
| 2018/0218727 A1* | 8/2018 | Cutler | H04L 65/602 |
| 2018/0260617 A1* | 9/2018 | Jones | G06F 21/34 |
| 2019/0068636 A1* | 2/2019 | Wang | H04L 9/30 |
| 2019/0096021 A1* | 3/2019 | Jarvis | G06F 21/34 |
| 2019/0188814 A1* | 6/2019 | Kreitzer | G06Q 50/265 |
| 2019/0197815 A1* | 6/2019 | Kamal | G06K 9/00892 |
| 2019/0220662 A1* | 7/2019 | Shenouda Dawoud | G06F 3/04815 |
| 2020/0058214 A1* | 2/2020 | Darnell Muppirala | G06K 9/00892 |

OTHER PUBLICATIONS

Sushanta Das et al. "Position Verification in Vehicular Communications," IEEE, Apr. 9, 2021 (Year: 2021).*
"Non-Final Office Action," dated Jun. 9, 2020 in U.S. Appl. No. 16/122,329. 11 pages.
International Search Report and Written Opinion dated Sep. 4, 2019 in International Application No. PCT/US2019/028848. 14 pages.
International Search Report and Written Opinion dated Sep. 4, 2019 in International Application No. PCT/US2019/028849. 13 pages.
International Patent Application No. PCT/US2019/028848, "International Search Report and Written Opinion", dated Sep. 4, 2019, 14 pages.
International Patent Application No. PCT/US2019/028849, "International Search Report and Written Opinion", dated Sep. 4, 2019, 13 pages.

* cited by examiner

IDENTITY CREDENTIAL VERIFICATION TECHNIQUES

CROSS REFERENCES TO RELATED APPLICATIONS

This application claims priority to U.S. Provisional Patent Application No. 62/662,178, filed on Apr. 24, 2018, entitled "Identity Credential Verification Techniques," the disclosure of which is hereby incorporated by reference in its entirety for all purposes.

BACKGROUND

In today's electronically driven world, securely maintaining sensitive personal information about a user has become an important aspiration across various different industries. Having sound security procedures that collect only what information is necessary and securely communicating the information is paramount to maintaining a person's privacy rights as well as guarding against misuse of a person's personal information. Many techniques have been employed for secure data collection and data exchanges such as the use of encryption, biometric authentication, digital signatures, credential and/or tokens, and the like. However, conventional techniques may include drawbacks that impact the efficiency and/or security of personal information collection, verification, and authentication. Additionally, current techniques do not afford a user to provide particular personal information at all, let alone securely. The disclosure below addresses these and other problems, individually and collectively.

BRIEF SUMMARY OF THE INVENTION

Embodiments of the present disclosure can provide systems, methods, and computer-readable medium for improving data security with respect to data collection, verification, and authentication techniques associated with obtaining and transmitting identity information.

In some embodiments, a computer-implemented method is disclosed. The method may comprise obtaining, by a first device, a virtual driver's license credential associated with a user. The method may further comprise storing, by the first device, the virtual driver's license credential and a first license plate identifier associated with a vehicle. The method may further comprise receiving, by the first device while in a first vehicle, a communications request from a second device in a second vehicle, the communications request utilizing a short-range communications protocol and comprising a second license plate identifier. The method may further comprise presenting, on a user interface of the first device, an option to approve the communications request based at least in part on determining that the second license plate identifier matches the first license plate identifier. The method may further comprise, in accordance with a determination that the option was selected, transmitting, by the first device in the first vehicle to the second device in the second vehicle, a response to the communications request via a short-range communications channel corresponding to the short-range communications protocol. The method may further comprise establishing, utilizing a secure communications protocol, a secure communications channel between the first device and the second device based at least in part on transmitting the response. The method may further comprise transmitting, by the first device in the first vehicle to the second device in the second vehicle, at least a portion of the virtual driver's license credential utilizing the secure communications channel.

In some embodiments, a computing device is disclosed. The computing device may comprise a processor and a memory storing computer-readable instructions that, upon execution by the processor, configure the computing device to perform operations. The operations may include storing a virtual driver's license credential and a license plate identifier associated with the virtual driver's license credential. The operations may further include receiving a communications request from a different computing device, the communications request utilizing a short-range communications protocol and including the license plate identifier. The operations may further include presenting, at a user interface of the computing device, an option to approve the communications request. The operations may further include, in accordance with a determination that the option was selected, transmitting a response to the communications request to the different computing device via a short-range communications channel corresponding to the short-range communications protocol. The operations may further include establishing, utilizing a secure communications protocol, a secure communications channel between the computing device and the different computing device based at least in part on transmitting the response. The operations may further include transmitting, to the different computing device, at least a portion of the virtual driver's license credential utilizing the secure communications channel.

In some embodiments, a computer-readable storage medium is disclosed. The computer-readable storage medium may have stored thereon computer-executable instructions that, when executed by a processor, cause the processor to perform operations. The operations may include storing a virtual driver's license credential and a license plate identifier associated with the virtual driver's license credential. The operations may further include receiving a communications request from a different computing device, the communications request utilizing a short-range communications protocol and comprising the license plate identifier. The operations may further include presenting, at a user interface, an option to approve the communications request. The operations may further include in accordance with a determination that the option was selected, transmitting a response to the communications request to a different computing device via a short-range communications channel corresponding to the short-range communications protocol. The operations may further include establishing, utilizing a secure communications protocol, a secure communications channel with the different computing device based at least in part on transmitting the response. The operations may further include transmitting, to the different computing device, at least a portion of the virtual driver's license credential utilizing the secure communications channel.

BRIEF DESCRIPTION OF THE DRAWINGS

Various embodiments in accordance with the present disclosure will be described with reference to the drawings, in which.

DETAILED DESCRIPTION OF THE INVENTION

Figure 1:
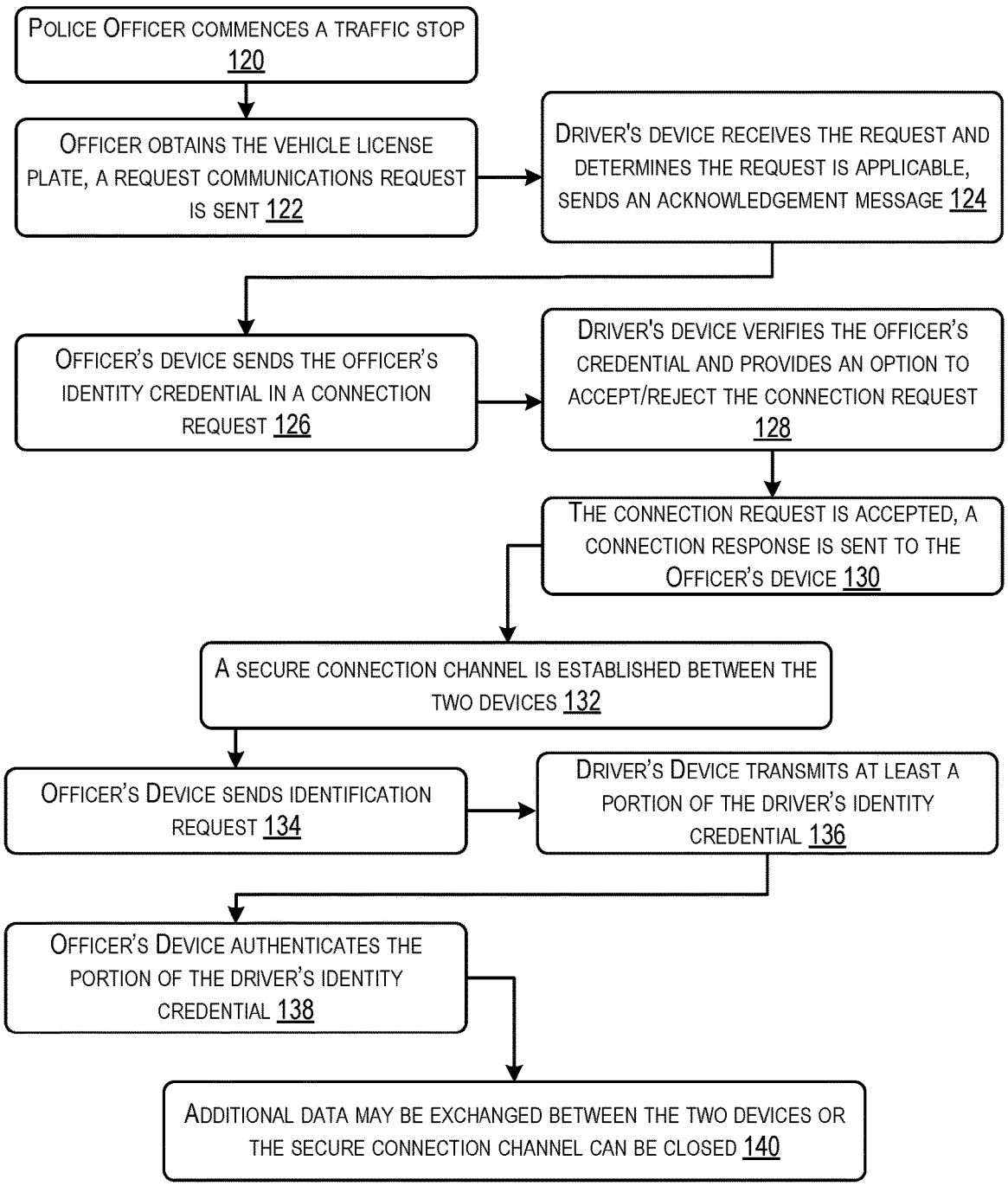
FIG. 1 illustrates an exemplary protocol for securely communicating and authenticating identity information, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, improving data security with respect to data collection, verification, and authentication techniques associated with obtaining and transmitting identity information. As used herein, "identity information" may include any suitable information that is associated with a person's identity. By way of example, identity information may include, but not limited to, a first name, an identity credential number, a last name, an address, a birth data, an identity credential issue date, an identity credential expiration date, organ donor status, an image of the user, or any suitable information associated with an identity credential (e.g., a virtual driver's license). Similarly, identity information may include passport information or any suitable information which pertains to a user's identity. As used herein, "personal information" may include any suitable information associated with a person that may not necessarily pertain to the person's identity. For example, personal information may include vehicle registration information, immigrant/non-immigrant visa information, insurance documents, images associated with the user and/or provided by the user, or the like. A "credential" (used synonymously with an "identity credential") may be a credential and/or token that is generated from identity information by a credential provider (e.g., an identity credential provider such as a Web service or other entity capable of generating, managing, and/or providing credentials such as identity credentials). It should be appreciated that any example herein that refers to a "virtual driver's license credential" (an example of an identity credential) may be similarly applied in contexts in which a different identity credential is utilized (e.g., a virtual passport credential). In some embodiments, the identity credential may be digitally signed using a private key associated with the credential provider for which a public key is known to at least one other device for verification purposes. In still further embodiments, the identity credential may additionally, or alternatively be digitally signed using a private key associated with a transmitting device for which a public key is known to at least one other device for verification purposes. Although examples herein utilize departmental agencies in the context of particular types of identity information, it should be appreciated that the techniques discussed herein can be applied to a variety of contexts outside of those provided herein.

In some embodiments, an identity credential associated with a user may be provided by a credential provider. The credential provider may be a government agency (e.g., the U.S. Department of Motor Vehicles (DMV), the U.S. Department of State, or any suitable agency/entity of any suitable city/region/country responsible for issuing local, regional, and/or national identity credentials) or another trusted entity and the credential may include encrypted and/or unencrypted identity information. By way of example, the DMV may provision a credential that includes a person's driver's license information. In some embodiments, the credential may be digitally signed by using a private key of the DMV such that the identity credential may be verified using a public key associated with the DMV. Once provisioned, a user may receive the identity credential electronically (e.g., via an application operating on the user's device). Subsequently, when the user desires to provide some portion of their identity information, the identity credential may be utilized to provide the information to another user device.

As a non-limiting example, a user may communicate with the credential provider (e.g., the DMV) to request that a credential be provisioned. For example, the user may interact with an application and/or user interface provided by a website associated with the credential provider (e.g., the DMV) and/or the user may interact with credential provided in person. In response to an electronic request for a credential, the credential may be generated using identity information (e.g., driver's license information) associated with the user (e.g., using driver's license information maintained by the DMV). The credential may be digitally signed with a private key associated with the credential provider and electronically delivered to the user's device via any suitable electronic means. Additionally, the public key associated with the credential provider may be distributed to a variety of user devices for later verifying the credential.

In some embodiments, as part of a credential provisioning process, the user may select a particular biometric input method. For example, the user may be prompted to select from a list of biometric input methods including fingerprint scanning, image capture (e.g., for capturing an image of the user's face), voice recognition, iris scanning, retina scanning, or the like. The user may then provide biometric information (e.g., a fingerprint scan, an iris scan, an image of the user's face, a voice sample, a retina scan) corresponding to the selected biometric input method and the provided biometric information may be associated with his credential. In some embodiments, the biometric information may be included as part of the credential. Similarly, an indication of the selected biometric input method may be included in the credential during the provisioning process. In some examples, the credential (and potentially the biometric information and an indication of the selected biometric input method) may be provided to the user's device via any suitable electronic means.

The user device may receive and store the credential in local memory. When received, or at another suitable time, a private key specific to the user device may be utilized to digitally sign the credential. Thus, in some embodiments, the credential may include the digital signature of the credential provider and/or the digital signature of the user device from which the credential is transmitted. The public key associated with the user's device may be distributed and stored, for example, on other devices for later verification purposes. In some embodiments, the user device may operate an application that provides functionality for requesting, receiving, and storing identity credentials (e.g., a digital wallet application, an application associated with secure communication of identity information, etc., herein after referred to as a "credential application"). Using various interfaces of the credential application, the user may associate the credential with an identifier (e.g., a license plate number of a vehicle owned or operated by the user, a label, a name, etc.). Subsequently, the user may provide some portion of the credential in response to identity credential requests received from another device.

In at least one embodiment, another user (e.g., a police officer) may operate a separate user device (e.g., a laptop, a smartphone, etc.) configured with an application for requesting identity information (hereinafter, referred to as a "requesting application"). The requesting application may be the same type of application or a different type of application as the credential application operating on the driver's device. In some examples, perhaps during a routine traffic stop, a police officer may utilize an infrared scanner, a keyboard, a camera, or any suitable input device to provide the license plate number of the stopped vehicle. In some examples, the input device may be a separate device that is configured to communicate the vehicle driver's license number to the requesting application operating on the officer's user device. In other examples, the vehicle driver's license number may be input via the officer's user device using an interface of the requesting application.

The requesting application of the officer's user device may be configured to store an identity credential associated with the officer. This credential may include any suitable identity information (e.g., first name, last name, badge number, supervising officer, associated law enforcement agency, an image of the officer, etc.) by which the identity of the officer may be verified. This credential may be provisioned in a similar manner as discussed above with respect to a user. For example, a law enforcement agency may be considered another credential provider from which credentials are provided for law enforcement officers. The credentials associated with each law enforcement officer may be digitally signed using a private key associated with the law enforcement agency. The public key associated with the law enforcement agency may be distributed and stored, for example, on the officer's device for later verification purposes. In some embodiments, the credential may be digitally signed using a private key associated with a particular officer's user device. Upon receipt of the officer's credential, the credential may be verified utilizing a public key known to be associated with the particular officer's user device. The public key associated with the officer's device may be distributed and stored, for example, on other devices for later verification purposes.

Once the license plate identifier is received, the requesting application operating on the Officer's device may be configured to transmit a communications request message which may include the license plate identifier. The communication request message may be transmitted via a short-range communications protocol (e.g., Bluetooth, Bluetooth Low Energy (BLE), etc.). "A communications request message" may be in any suitable and may include any suitable information (e.g., a license plate identifier, an identifier of the requesting party, etc.). The communications request may be received by a variety of user devices (e.g., user devices within a threshold distance of the officer's device). Each user device operating a credential application may be configured to determine whether an association between the license plate identifier and the user is known. The driver's credential application may be configured to determine that the license plate identifier matches one stored in local memory. Accordingly, the driver's credential application may be configured to respond to the communications request.

The credential application of the driver's device may request identity from the police officer's device, which may be provided via the requesting application operating on the police officer's phone. The police officer's identity may be verified by the credential application of the user's device. In some embodiments, the verification may occur at the user's device, while in other embodiments, the credential may be provided by the user's device to a device associated with the credential provider which may then perform the verification process. If the identity of the police officer is verified (e.g., the officer's identity credential is valid), the user may be provided an interface for initiating a secure communications channel between the user's device and the police officer's device. A message may be provided via the short-range communications channel that the user has agreed or otherwise desires to initiate a secure communications channel.

Upon receiving an indication that the user has agreed/desires to initiate the secure communications channel, the user's device and the police officer's device may execute any suitable protocol for establishing a secure communications channel. Examples of a secure communications channel may include any suitable communication connection which includes a degree of certainty that third parties cannot ascertain information exchanged via the communication connection. For example, a secure communications channel may utilize encryption techniques and public keys associated with the devices utilizing the channel such that data which is encrypted by a transmitting device may be verified by a recipient device. The secure communications channel may be part of a communications network including a near-me area network (NAN), a wireless network, a telecommunications network, or the like.

Once the secure communications channel is established, the driver and police officer may exchange any suitable information including, a portion of an identity credential (e.g., some portion of the driver's license information), and/or personal information (e.g., insurance documents, etc.), and/or any suitable information associated with the traffic stop (e.g., a warning, a traffic ticket, and the like). The requesting device operating at the police officer's device may similarly verify the authenticity of the user's credential utilizing the public key associated with the DMV.

In some embodiments, prior to allowing access to an identity credential for transmission and/or viewing purposes, a credential application may be configured to enforce access rules associated with a credential. For example, the credential application may be configured to request biometric information of the user (e.g., the driver). In some examples, the user may be required to select from a number of differing biometric input methods. For example, the user may select "fingerprint scan" from a list which also includes "iris scan," "facial recognition," and the like. The credential application may then afford the user the ability to provide biometric information (e.g., user input such as a fingerprint scan in this case). The credential application may be further configured to determine that the user provided biometric input that matches stored biometric information associated with the credential (or included as part of the credential). Additionally, the credential application may be further configured to determine that the user utilized a biometric input method that matches a stored biometric input method associated with the credential (or included as part of the credential). Thus, if the credential was secured using a fingerprint scan, the user would be required to select fingerprint scanning as the input method, in addition to providing a matching fingerprint, before the credential application would allow access to the stored credential.

By utilizing the techniques provided herein, the identity of users may be verified and identity information and/or personal information may be securely exchanged. The identification of the user's device need not be known in advance by the officer's device, rather the identity of the device may be ascertained by using the short-range communications channel in the manner discussed herein. This alleviates the need for associations between vehicles and drivers to be stored on the officer's device or from such associations having to be ascertainable by the officer's device (e.g., via a request to a credential provider computer). Additionally, identity of the user's device and authentication of the respective user's credentials may occur prior to establishing unnecessary secure connections that may waste processing resources of the respective devices. The aforementioned techniques are discussed in greater detail with respect to the following figures.

Although examples herein utilize an example traffic stop by a police office, it should be appreciated that similar techniques may be employed in a variety of contexts. By way of example, a border patrol office may utilize a requesting device in a similar manner as discussed above to verify a person's identity during, for example, a border patrol stop/inspection. As another example, a retailer may operate a device which may request and verify a credential provided by a customer's user device to verify the customer's age with respect to purchasing restricted items such as alcohol, tobacco, lottery tickets, and the like. Likewise, a restaurant may utilize a device which may request and verify a credential provided by a diner's user device in order to verify that the diner is over the legal age to purchase a glass of wine.

For example, FIG. 1 illustrates an exemplary protocol 100 for securely communicating and authenticating identity information, in accordance with at least one embodiment. The protocol 100 may be performed using user device 102 and user device 104. It should be appreciated that the protocol 100 may include a greater number or a lesser number of operations than those depicted in FIG. 1 and that operations (e.g., the operations depicted in FIG. 1) may be performed in any suitable order. The user device 102 may be provisioned with credential 106 and, in some cases, may be operated at least in part within vehicle 108. It should be appreciated that in any examples herein, the user device 102 could operate as a component of the vehicle 108 itself and/or the functionality of the user device 102 may be provided by a component of the vehicle 108. The user device 104 may be provisioned with credential 110 and, in some cases, may be operated at least in part within vehicle 112. The credential 106 and the credential 110 may be provisioned by the same credential provider (e.g., the DMV) or different credential providers. By way of example, the credential 106 may be provisioned by a credential provider associated with a law enforcement agency. Thus, the credential 106 may be associated with a particular law enforcement officer and/or the user device 102. In some embodiments, the credential 110 may be provisioned by a credential provider associated with a licensing agency such as the Department of Motor Vehicles. Thus, the credential 106 may be associated with a particular driver and/or the user device 104.

The credential 106 and the credential 110 may be provisioned and stored on the respective user devices prior to performance of the protocol 100. An example provisioning process may be explained in more detail with respect to FIG. 3. The credential 106 and the credential 110 may include any suitable identity information. By way of example, the credential 106 may include a first name, last name, badge number, associated law enforcement agency identifier, or any suitable information associated with the police officer's identity. The credential 110 may include driver's license information (e.g., a first name, last name, address, driver's license number, license issue date, license expiration date, organ donor status, height, weight, eye color, etc.), passport information, or any suitable information associated with the user's identity.

The protocol may begin at 120, where a police officer may commence a traffic stop. During a traffic stop, the officer may utilize some indication (e.g., such as overhead lights, a microphone, etc.) to indicate or instruct a driver of vehicle 112 to pull over and halt his vehicle.

At 122, the officer may obtain the vehicle license plate identifier of the vehicle 112 via user device 102 (or a device configured to communicate with user device 102). By way of example, the police officer may utilize a scanner, a camera, a keyboard, a microphone, or the like of the vehicle 108, of another device separate from the vehicle 108 (e.g., user device 102) in order to obtain the license plate identifier of vehicle 112. As a non-limiting example, the officer may enter the license plate identifier via a keyboard or touch interface of the user device 102. Once entered, the license plate identifier may be transmitted in a communication request message. The communications request may be broadcasted via a short-range communications channel utilizing a short-range communications protocol (e.g., a Bluetooth protocol such as iBeacon, or another suitable Bluetooth Low-Energy and/or proximity related protocol). In some embodiments, the user device 102 may be identified within the communication request message.

At 124, the user device 112 (as well as a number of proximate devices) may receive the request including the driver's license identifier via the short-range communications channel. The user device 112 may be configured to determine whether the communications request is applicable (e.g., via a credential application operating on the user device 112). For example, the user device 112 (the credential application) may determine whether or not the license plate identifier included in the communications request message matches a license plate identifier stored at the user device 112. If the license plate identifiers do not match, the user device 112 may be configured to ignore the communications request. If the license plate identifiers do match, the user device 112 may transmit an acknowledgement message to the user device 102.

At 126, upon receipt of the acknowledgement message, the user device 102 may be configured to transmit the credential 106 in a connection request message to the user device 104. A "connection request message" may be in any suitable form. In some embodiments, a connection request may be included in a "communications request message" described herein. Thus, information discussed as being included in a connection request message and/or a communication request message may be included in a single message in some embodiments. The credential 106 may be digitally signed with a private key of an associated credential provider (e.g., a law enforcement agency). In some examples, an officer's identity need not be transmitted and/or verified at all. By way of example, it may be the case, that only devices operated by law enforcement officers are configured to send a communications request message and/or connection request message. Thus, receipt of such message alone may be utilized to ensure that the requesting party is a police officer. In other embodiments, the officer's credential may be provided in the communication request message transmitted at 122 rather than being included in a separate connection request message.

At 128, the user device 104 may verify the identity of the officer. In examples in which a credential is received via a connection request message, the user device 104 may be configured to utilize one or more publicly distributed public keys associated with the law enforcement agency and/or the user device 102 identified in the connection request to verify the data contained in the connection request. For example, the public key may be previously-stored at the user device 104 and may be utilized with a digital signature included in the connection request to verify that the transmitter of the connection request is a police officer and that the information contained in the connection request has not been tampered with or modified. In some embodiments, the user device 104 may be configured to provide the user an interface to accept or reject the connection request. The interface may present the identity information of the officer (e.g., a picture of the officer's face, a badge number, the officer's name, etc.). In some embodiments, the interface may only be provided after the officer's credential/identity has been verified. The interface may additionally, or alternatively provide an option to accept and/or reject the connection request.

At 130, the connection request message may be accepted (e.g., via the interface provided at the user device 104). As a result, a connection response message may be transmitted by the user device 104 to the user device 102. The connection response message may include, among other things, an indication that the connection request has been accepted.

At 132, a secure communications channel may be established between user device 102 and user device 104. The user device 102 and the user device 104 may execute any suitable protocol for establishing a secure communications channel. As discussed above, a secure communications channel may include any suitable communication connection which includes a degree of certainty that third parties cannot ascertain or tamper with information exchanged via the communication connection. For example, a secure communications channel may utilize encryption techniques and public keys associated with the devices utilizing the channel such that data which is encrypted by a transmitting device may be verified by a recipient device. The secure communications channel may be part of a communications network including a near-me area network (NAN), a wireless network, a telecommunications network, or the like.

At 134, the user device 102 may transmit to the user device 104 an identification request via an identification request message. The identification request message may specify a specific type of identity information to which the request pertains. By way of example, the identification request message may indicate that the officer is requesting driver's license information (or at least a portion of the driver's license information).

At 136, the user device 104 may transmit at least a portion of the driver's identity credential (or multiple identity credentials). By way of example, the whole of the identity credential may be provided or a part of the identify credential (e.g., the driver's license number) may be provided. In some embodiments, the user may be provided an interface via the user device 104 at which the user can make a selection of the type and/or portions of the identity credential they wish to transmit. That is, the user can select what specific information and if any information at all is transmitted. In some embodiments, each portion of the identity credential may be individually digitally signed by the credential provider and/or the user device such that each portion of the identity credential is verifiable using the public key of the credential provider and/or the public key of the user device. In other examples, the identity credential may include any suitable number of related identity credentials which are individually verifiable using the public key of the credential provider and/or the public key of the user device.

At 138, the user device 102 may verify the identity credential (or portion of the identity credential) received from user device 104. By way of example, the user device 102 may access a previously-stored public key associated with a credential provider (e.g., the DMV). Using the public key, the user device 102 may verify one or more digital signatures of the identity credential(s) received. The verified identity information may be presented via the user device 102.

At 140, additional data may be exchanged between the user device 102 and the user device 104 via the secure communication channel. By way of example, the user of user device 104 may be provided the option to transmit any suitable personal information including, but not limited to, vehicle registration information and insurance information. The personal information may have been previously-provided stored at the user device 104 and/or the personal information may be accessible to the user device 104. As another example, the user device 102 may provide obtain or provide traffic ticket information to the user device 104. The traffic ticket information may be entered at the user device 102 via any suitable input obtained at the user device 102 (e.g., via keyboard input, touch screen input, image capture, or the like. In some examples, the user device 102 and the user device 104 may perform audio and/or video communications via the secure communication channel.

Figure 2:
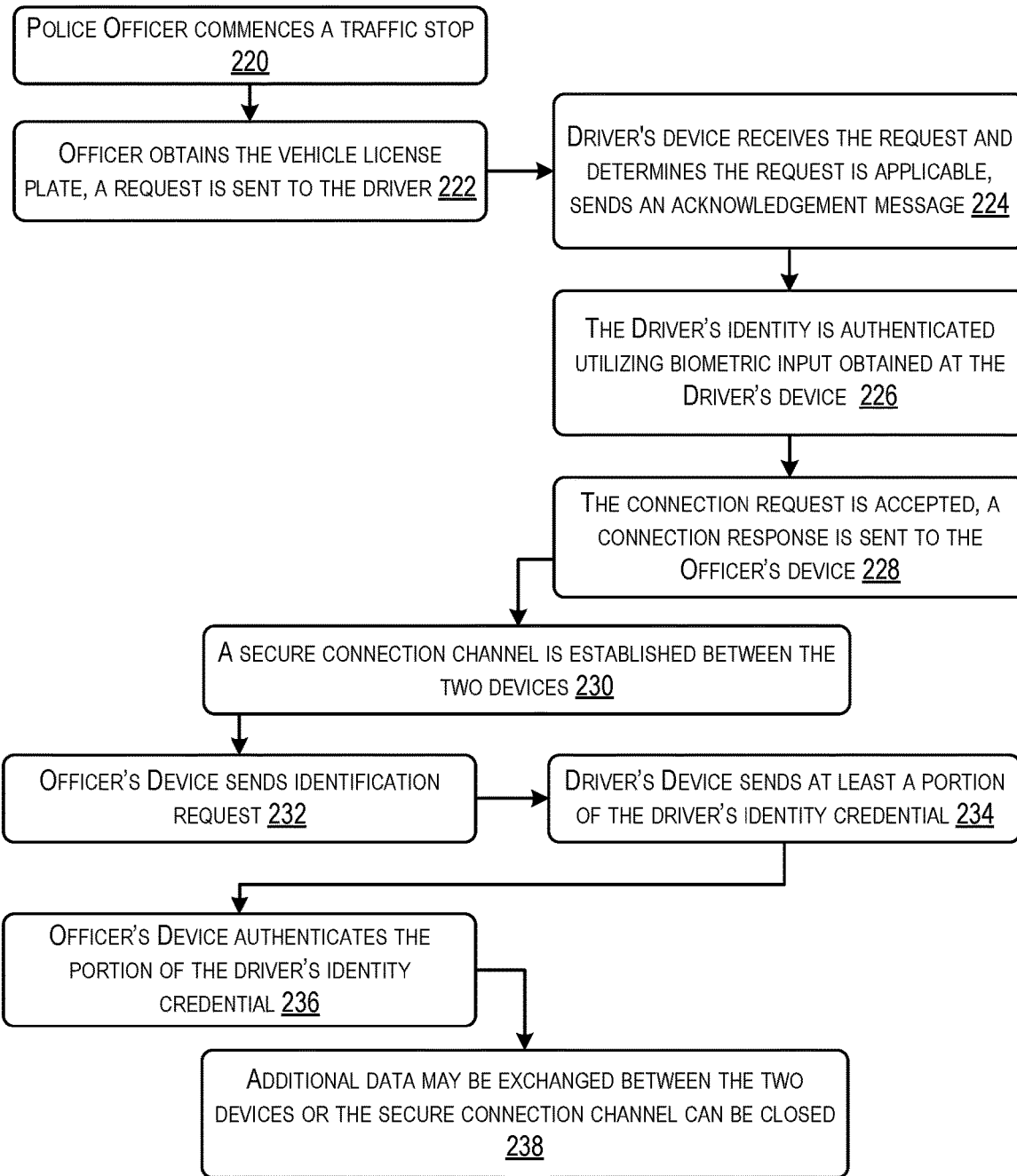
FIG. 2 illustrates an exemplary protocol for managing access to identity credentials utilizing biometric information and a biometric input method, in accordance with at least one embodiment.

FIG. 2 illustrates an exemplary protocol 200 for managing access to identity credentials utilizing biometric data, in accordance with at least one embodiment. It should be appreciated that the protocol 200 may include a greater number or a lesser number of operations than those depicted in FIG. 2 and that operations (e.g., the operations depicted in FIG. 1) may be performed in any suitable order. The protocol 200 may be performed using user device 202 and user device 204. User device 202 may be an example of the user device 102 of FIG. 1 and/or user device 204 may be an example of the user device 104 of FIG. 1. The user device 202 may be provisioned with credential 206 (e.g., the credential 106 of FIG. 1) and, in some cases, may be operated at least in part within vehicle 208 (e.g., the vehicle 108 of FIG. 1). The credential 206 may be provisioned by a credential provider associated with a law enforcement agency and may be associated with a particular law enforcement officer and/or the user device 202. The credential 206 may be provisioned and stored on the user device 202 prior to the performance of the protocol 100. In some embodiments, the credential 206 may include at least a first name, last name, badge number, associated law enforcement agency identifier, or any suitable combination of the above and/or any suitable information associated with the police officer's identity.

In some embodiments, the credential 210 (e.g., the credential 110 of FIG. 1) that is associated with a particular driver and/or the user device 204 may be provisioned by a credential provider associated with a licensing agency such as the Department of Motor Vehicles. The credential provider of credential 210 may be the same as or different from the credential provider of credential 206. In some embodiments, as part of a process for provisioning the credential 210, the user may select a particular biometric input method. For example, a particular biometric input method may be selected from a number of biometric input methods including iris scanning, fingerprint scanning, image capture (e.g., associated with capturing an image of the user's face), or the like. The user may provide biometric information (e.g., a fingerprint scan, an iris scan, an image of the user's face) corresponding to the selected biometric input method and the provided biometric information may be associated with credential 210 by the credential provider (e.g., via a computer operated by or on behalf of the credential provider). In some embodiments, the biometric information and/or an indication of the biometric input method may be included as part of the credential 210 and/or the biometric information/ indication of the biometric input method may be stored as an association with the credential 210 (e.g., via a mapping which includes the credential 210 and the corresponding biometric information and/or indication of the biometric input method utilized to obtain the biometric information). In some examples, any suitable combination of the credential 210, the biometric information, the indication of biometric input method, and/or the mapping corresponding to such information may be provided to the user device 204 via any suitable electronic means. In the example depicted in FIG. 2, the credential 210 may include driver's license information (e.g., a first name, middle name/initial, last name, address, driver's license number, license issue date, license expiration date, organ donor status, height, weight, eye color, or any suitable combination of the above). It should be appreciated that in other contexts outside of traffic stops, the credential 210 may include passport information (e.g., a first name, middle name/initial, last name, passport identifier, birth date, height, weight, eye color, citizenship, passport issue date, passport expiration date, one or more visited countries, one or more dates of entry associated with one or more visited countries, or any suitable combination of the above) or identity card information (e.g., or any suitable information associated with the user's identity card).

The protocol 200 may begin at 220, where a police officer may commence a traffic stop. During a traffic stop, the officer may utilize some indication (e.g., such as overhead lights, a microphone, etc.) of the vehicle 208 to indicate or instruct a driver of vehicle 212 (e.g., the vehicle 112 of FIG. 1) to pull over and halt.

At 222, the office may obtain the vehicle license plate identifier of the vehicle 212 via user device 202 (or a device configured to communicate with user device 202). By way of example, the police officer may utilize a scanner, a camera, a keyboard, a microphone, or the like of the vehicle 208, of another device separate from the vehicle 208 (e.g., user device 202) in order to obtain the license plate identifier of vehicle 212. As a non-limiting example, the officer may enter the license plate identifier via a keyboard or touch interface of the user device 202. Once entered, the license plate identifier may be transmitted in a communication request message. The communications request may be broadcasted via a short-range communications channel utilizing a short-range communications protocol (e.g., a Bluetooth protocol such as iBeacon, or another suitable Bluetooth Low-Energy and/or proximity related protocol). In some embodiments, the user device 202 may be identified within the communication request message.

At 224, the user device 224 (as well as a number of devices proximate/within a threshold distance of user device 202) may receive the request including the driver's license identifier via the short-range communications channel. The user device 204 may determine whether the communication request message is applicable (e.g., via a credential application operating on the user device 204). For example, the user device 204 (the credential application) may determine whether or not the license plate identifier included in the communication request message matches a license plate identifier stored at the user device 204. If the license plate identifiers do not match, the user device 204 may be configured to ignore the communication request message. If the license plate identifiers match, the user device 204 may transmit an acknowledgement message to the user device 202 (e.g., utilizing an identifier of the user device 202 included in the communication request message).

Although not depicted in FIG. 2, it should be appreciated that a connection request message and connection response message may be utilized in a similar manner as discussed above in connection with blocks 126-130 of FIG. 1. In some examples, the user device 204 may verify any identity credential included in the connection request message and/or provide an option to accept/reject the connection request in a similar manner as discussed above in connection with block 128 of FIG. 1.

At 226, the driver's identity may be authenticated utilizing biometric input obtained at the driver's device. In some embodiments, the user device 204 may provide an option to authenticate the driver's identity prior to providing an option to accept the connection request. Additionally, or alternatively, the identity of the user of user device 204 may be authenticated after a secure communications channel is established and before credential 206 is accessed and/or transmitted. The user device 204 may enforce access rules associated with the credential 206. By way of example, the user device 204 may prompt the user (e.g., via a credential application operating on the user device 204) to select a biometric input method (e.g., iris scanning, fingerprint scanning, image capture, etc.). Once a biometric input method is selected, the user device 204 may verify (e.g., utilizing the credential 206 and/or a mapping between the credential and the biometric input method associated with the credential at the time of provisioning) that the selected biometric input method matches the biometric input method associated with the credential at the time of provisioning. If the user selects a biometric input method that does not match the input method used at the time of provisioning, the user device 204 may restrict any connection between the user device 204 and the user device 202 from being established and/or the user device 204 may restrict access and/or transmission of the credential 210. If the biometric input method selected matches the input method used at the time of provisioning, the user device 204 may further prompt the user for biometric information input.

As a non-limiting example, upon a selection associated with fingerprint scanning as a biometric input method, the user device 204 may prompt the user to enter his fingerprint via a fingerprint scanner of the device 204. The user device 204 may obtain and/or receive the biometric information and determine whether the user provided biometric input that matches stored biometric information associated with the credential 206. This determination may be based at least in part on utilizing the biometric information included (e.g., embedded) in the credential 206 and/or a mapping between biometric information provided during the provisioning process and the credential 206. If the biometric information entered at the user device 204 matches the biometric information provided during the provisioning process, the user device 204 may provide an option (e.g., via a user interface provided at the user device 204) for accepting and/or rejecting the connection request. If the biometric information entered at the user device 204 does not match the biometric information provided during the provisioning process, the user device 204 may restrict the user from accepting/rejecting the connection request, a secure communications channel from being established between the user device 204 and the user device 202, and/or may prevent access/transmission of the credential 210.

At 228, assuming the driver's identity is authenticated in the manner discussed above and the user provides a selection to accept the connection request, a connection response message may be transmitted by the user device 204 to the user device 202. The connection response message may include, among other things, an indication that the connection request has been accepted.

At 230, a secure communications channel may be established between user device 202 and user device 204. The user device 202 and the user device 204 may execute any suitable protocol for establishing a secure communications channel. As discussed above, a secure communications channel may include any suitable communication connection which includes a degree of certainty that third parties cannot ascertain or tamper with information exchanged via the secure communication connection. For example, a secure communications channel may utilize encryption techniques and public keys associated with the devices utilizing the channel such that data which is encrypted by a transmitting device may be verified by a recipient device. The secure communications channel may be part of a communications network including a near-me area network (NAN), a wireless network, a telecommunications network, or the like.

At 232, the user device 202 may transmit to the user device 204 an identification request via an identification request message. The identification request message may specify a specific type of identity information to which the request pertains. By way of example, the identification request message may indicate that the officer is requesting driver's license information (or at least a portion of the driver's license information). In some embodiments, the identification request message may further indicate a request for personal information such as vehicle registration and/or insurance information which may be stored at the user device 204.

At 234, the user device 204 may transmit at least a portion of the driver's identity credential(s) and/or personal information such as vehicle registration and/or insurance information. By way of example, the whole of the identity credential may be provided or a part of the identify credential (e.g., the driver's license number) may be provided. In some embodiments, the user may be provided an interface via the user device 204 at which the user can make a selection of the type and/or portions of the identity credential they wish to transmit. This same interface or a different interface may provide the user the ability to select any suitable personal information (e.g., vehicle registration and/or insurance information) to be included. Thus, the user can select what specific information and if any information at all is transmitted. In some embodiments, each portion of the identity credential may be individually digitally signed by the credential provider (and/or the user device) such that each portion of the identity credential is verifiable using the public key of the credential provider (and/or the public key of the user device). In other examples, the identity credential may include any suitable number of related identity credentials which are individually verifiable using the public key of the credential provider. Accordingly, the user may elect to provide some subset of the information associated with his driver's license. As a non-limiting example, the user may elect to transmit only his full name, his driver's license issue date, and his driver's license expiration date rather than every attribute of his driver's license information. By providing these options, the user may be control what specific information he shares with the officer via the secure communications channel.

At 236, the user device 202 may verify the identity credential (or portion of the identity credential) received from user device 104. By way of example, the user device 102 may access a previously-stored public key associated with a credential provider (e.g., the DMV) and/or the user device 102. Using the public key, the user device 202 may verify one or more digital signatures of the identity credential(s) received. The verified identity information may be presented via the user device 202. If the credential(s) are not verifiable (e.g., the verification process indicates that the information was not digitally signed by the DMV, the information was not digitally signed by the user device 102, etc.) the user device 202 may display an indication that the credential(s) are not verifiable and the officer may proceed accordingly (e.g., verbally request to see the driver's physical license).

At 238, additional information may be exchanged between the user device 202 and the user device 204 via the secure communications channel. For example, if personal information such as vehicle registration information and/or insurance information was not provided with the credential at 234, user device 204 may be provided an option to transmit such information at 238. As discussed above, the personal information may have been previously-provided stored at the user device 204 and/or the personal information may be otherwise accessible to the user device 204. As another example, the user device 202 may provide traffic ticket information to the user device 204 at 238. The traffic ticket information may be entered at the user device 202 via any suitable input obtained at the user device 202 (e.g., via keyboard input, touch screen input, image capture, or the like.

It should be appreciated that although FIGS. 1 and 2 provide example protocols that are performed between a user device operated by a police officer and a user device operated by a civilian, it is contemplated that a similar protocol may be utilized in other contexts. As a non-limiting example, a retailer may operate a device which may request and verify a credential provided by a customer's user device to verify the customer's age with respect to purchasing restricted items such as alcohol, tobacco, lottery tickets, and the like. Likewise, a restaurant may utilize a device which may request and verify a credential provided by a diner's user device in order to verify that the diner is over the legal age to purchase a glass of wine. As described above, the user providing his credential may control the particular information that is transmitted to the requestor via user interface selections. By way of example, for the retail and/or restaurant examples discussed above, the customer/diner may opt to provide only his age for verification. Accordingly, the customer/diner may keep private any information of his credential that is not necessary for the verification required for the given situation.

Figure 3:
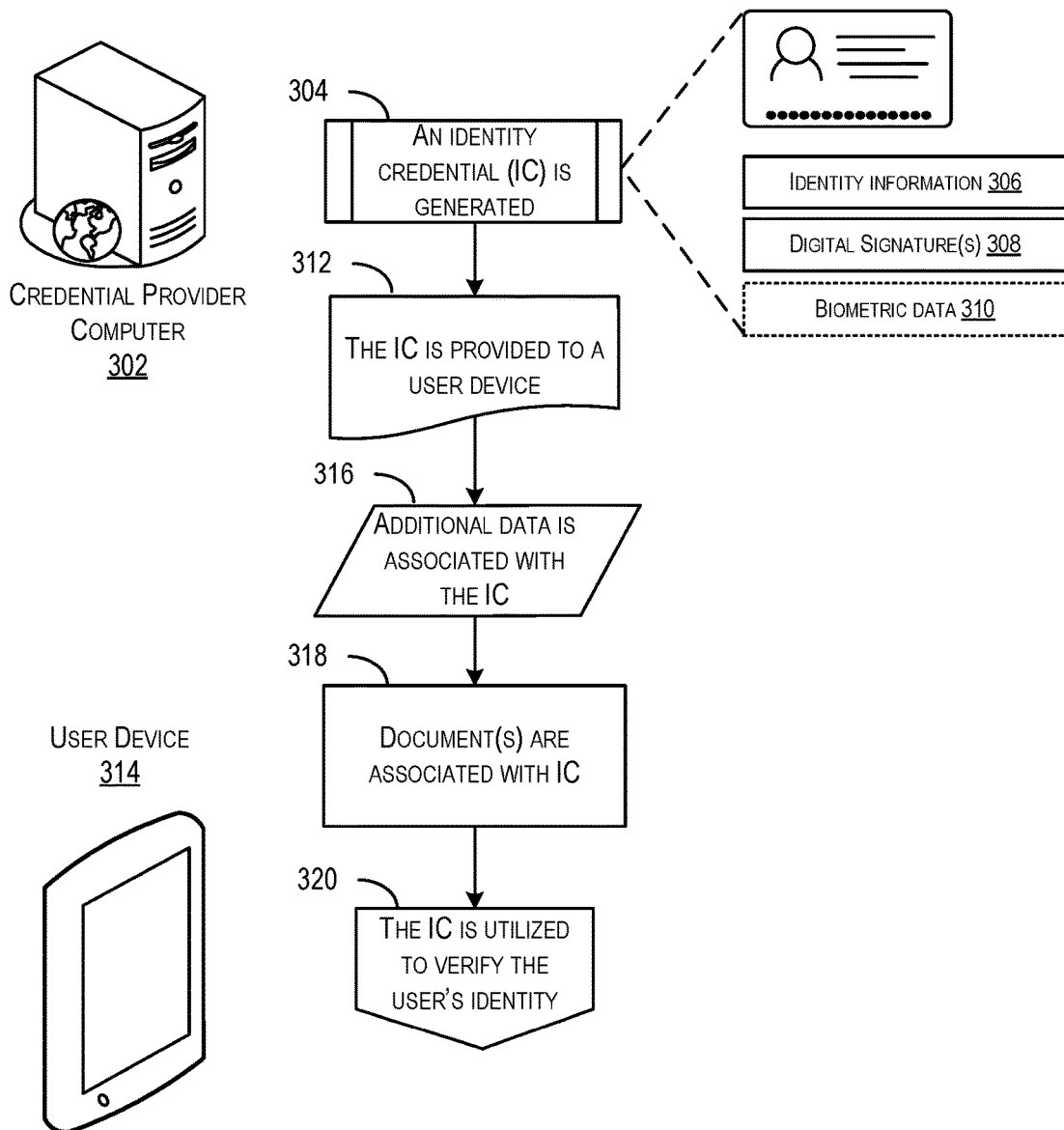
FIG. 3 is a flow diagram of an example method for provisioning and securing identity information, in accordance with at least one embodiment.

FIG. 3 is a flow diagram of an example method 300 for provisioning and securing identity information, in accordance with at least one embodiment. The method 300 may be performed by a computer associated with a credential provider (e.g., credential provider computer 302). It should be appreciated that the method 300 may include a greater number or a lesser number of operations than those depicted in FIG. 3 and that operations (e.g., the operations depicted in FIG. 3) may be performed in any suitable order.

At 304, identity information may be generated by the credential provider computer 302. By way of example, the credential provider computer 302 may be utilized to obtain identity information 306. As discussed above, identity information may include any suitable information by which a person may be identified including, but not limited to, driver's license information, passport information, identity card information, and the like. The identity information may be obtained by the credential provider computer 302 through any suitable means. For example, a driver's license may be scanned and image processing techniques utilized to extract the identity information 306. Additionally, or alternatively, the identify information 306 may be manually entered at an input device of the credential provider computer 302 and/or the credential provider computer 302 may access a database (e.g., a DMV records database) which stores identity information for many individuals in order to access the identity information 306 associated with a particular person.

In some embodiments, biometric data 310 may be obtained by the credential provider computer 302. Biometric data 310 may include biometric information (e.g., an iris scan, a fingerprint scan, an image of a person associated with the identity information 306, etc.) and an indication of the biometric input method utilized to provide the biometric information. In some examples, the biometric information may be collected by the credential provider computer 302 via any suitable biometric input method. By way of example, a person for whom the identity credential is associated may select (e.g., via the credential provider computer 302) a particular biometric input method for providing biometric information for securing his identity credential. As a non-limiting example, the person may opt to utilize an iris scanner in order to provide an iris scan with which his identity credential will be associated. The credential provider computer 302 may associate (e.g., utilizing a mapping) the identity credential generated with the biometric information and an indication of the biometric input method utilized to provide the biometric information. In some examples, the biometric data 310 may be embedded in the identity credential.

In accordance with at least one embodiment, the credential provider computer 302 may generate one or more digital signatures (e.g., digital signature(s) 308) using the identity information 306 (and/or the biometric data 310) and a private key associated with the credential provider. By way of example, a single digital signature for the identity information 306 may be generating utilizing a private key associated with the credential provider. In some examples, the credential provider computer 302 may generate any suitable number of digital signatures corresponding to any suitable portion of the identity information 306. In still further examples, the identity information 306 may be used to generate multiple identity credentials that individually represent a portion of the identity information 306. Each identity credential generated may be digitally signed using the private key of the credential provider. Similarly, the identity information 306 and the biometric data 310 may be used to generate a single digital signature or the biometric data 310 and any portion of the identity information may be used to generate any suitable number of digital signatures. As used herein, the term "identify credential" may be utilized to refer to identity credentials containing identity information 306 alone, as well as identity credentials which embed, or are associated with, biometric data 310.

At 312, the identity credential (or any suitable number of generated identity credentials) may be provided to a user device (e.g., the user device 314, an example of the user device 104 and 204 of FIGS. 1 and 2, respectively). In some examples, biometric data 310 may be included in the identity credential or provided with the identity credential provided at 312. The user device 314 may be configured to store the identity credential(s) (and the biometric data 310, if applicable) in local memory. As a non-limiting example, a credential application (e.g., a digital wallet application or any suitable application associated with the management of identity credentials) may be utilized to receive and store the identity credential(s) (and the biometric data 310, if applicable) in local memory at the user device 314. In some embodiments, the user device 314 may store a mapping between the identity credential(s) and the biometric data 310 received.

At 316, additional data may be associated with the identity credential. As a non-limiting example, a user interface may be provided via the application that enables the user to enter an identifier (e.g., a vehicle license plate number, an identifier with which the user desires the identity credential to be associated, etc.). The application may cause the identifier to be associated with the identity credential. For example, the application may maintain a mapping that indicates an association between the identifier, the identity credential(s), and the biometric data 310. In some cases, the user may be provided the ability to associate more than one identifier with a particular identity credential (or set of identity credential). As a specific example, a user may utilize a user interface provided via a digital wallet application to associate the license plate numbers of his vehicle and/or a vehicle that is primary used by his daughter, with an identity credential that was generated from his driver's license information.

At 318, one or more documents may be associated with the identity credential. By way of example, vehicle registration information and/or insurance information may be stored on the user device 314. Such information may have been obtained in any suitable manner, for example, vehicle registration information may be manually entered by the user and/or an image of the vehicle registration may be obtained utilizing an image capture device of the user device 314. The insurance information may be similarly obtained. A user interface may be provided via the application that provides an option to associate the one or more documents with the identity credential. Upon selection, the one or more documents may be associated with the identity credential. In some embodiments, the mapping that indicates an association between the identifier (e.g., a license plate identifier), the identity credential(s), and the biometric data 310 may be updated to indicate an association with the one or more documents.

At 320, the identity credential may be utilized to verify the user's identity. For example, the identity credential may be utilized in the manner discussed above in connection with FIGS. 1 and 2.

Figure 4:
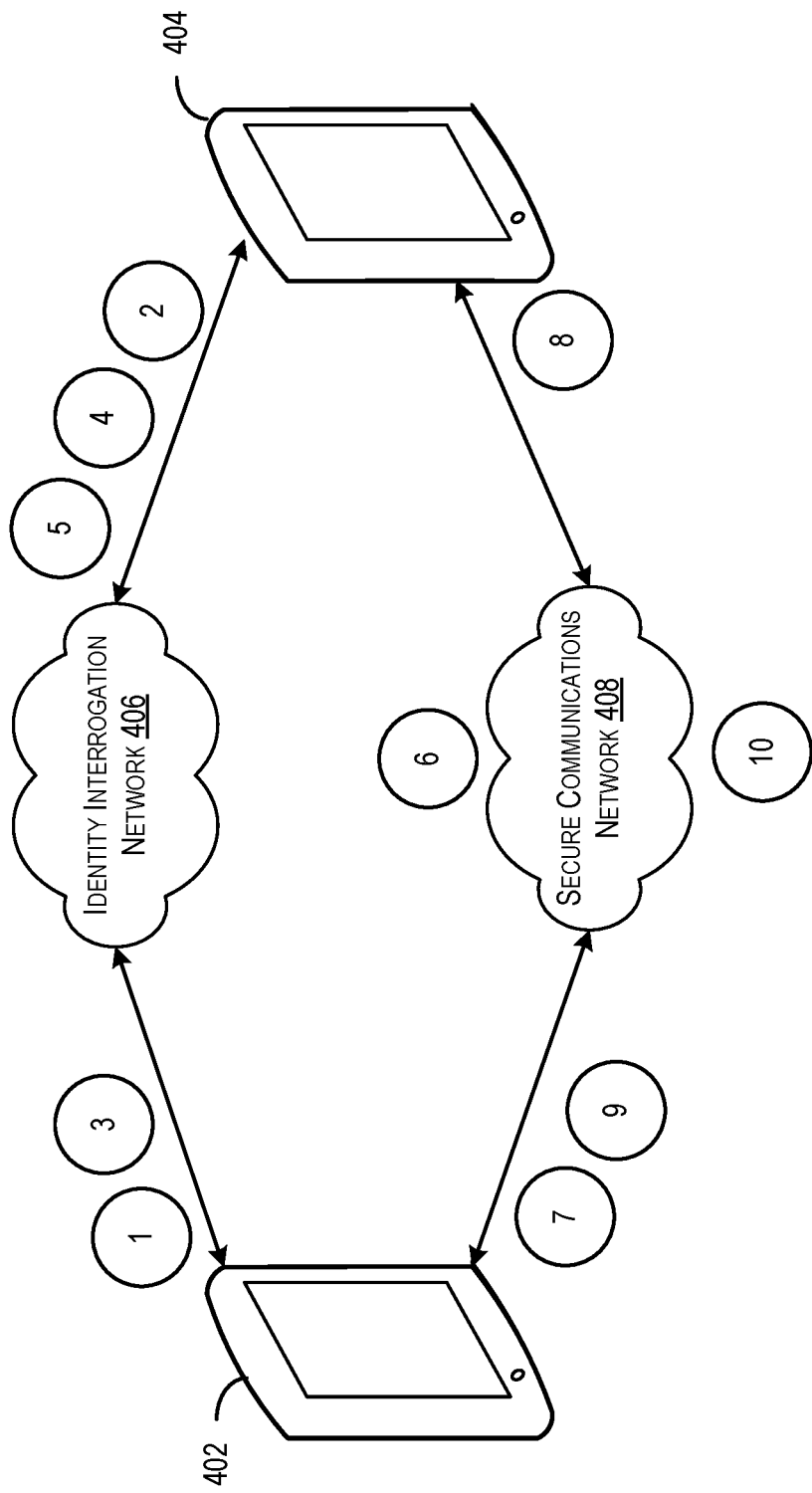
FIG. 4 is a schematic diagram illustrating example techniques for providing secure data exchanges between two devices, in accordance with at least one embodiment.

FIG. 4 is a schematic diagram illustrating an example technique 400 for providing secure data exchanges between two devices, in accordance with at least one embodiment. The example technique 400 may be performed by two devices, user device 402 and user device 404. User devices 402 and 404 may individually be any suitable electronic device configured to transmit and receive messages. User devices 402 and 404 may be examples of the user devices of FIGS. 1-3. The user devices 402 and 404 may individually store previously-generated (e.g., by one or more credential providers) identity credentials, personal information, and/or identifiers, or any suitable combination of the above in local memory. Additionally, the user devices 402 and 404 may store a public key associated with a respective credential provider of the stored identity credentials.

At 1, user device 402 may receive an identifier (e.g., an identifier verbally provided by the user of user device 404, an identifier associated with the user device 404 (e.g., a license plate number, a serial number of the user device 404, etc.) via user input. The user input may be received via an application operating on the user device 402. Once entered, the identifier may be transmitted in a communication request message. The communications request may be broadcasted via a short-range communications channel utilizing a short-range communications protocol (e.g., a Bluetooth protocol such as iBeacon, or another suitable Bluetooth Low-Energy and/or proximity related protocol) and identity interrogation network 406. The identity interrogation network 406 may be any suitable network with which short-range communications may be performed using the short-range communications protocol.

At 2, the user device 404 (and potentially other proximate devices within a threshold distance) may receive the communication request message including the identifier via the short-range communications channel (e.g., via an iBeacon protocol). The user device 404 may be configured to determine whether the communications request message is applicable (e.g., via an application operating on the user device 404). For example, the user device 112 (the credential application) may determine whether or not the identifier included in the communications request message matches an identifier stored at the user device 404. If the identifiers do not match, the user device 404 may be configured to disregard the communications request message. If the identifiers match, the user device 404 may transmit an acknowledgement message to the user device 402 to indicate that the communication request message was received and acknowledged.

At 3, upon receipt of the acknowledgement message, the user device 402 may transmit an identity credential associated with the user of the user device 402 within a communications request message. The identity credential may be digitally signed with a private key of an associated credential provider (e.g., a law enforcement agency, the DMV, etc.) and/or the identity credential may be digitally signed with a private key associated with the user device 402. In some embodiments, the identity credential stored at user device 402 may not be transmitted in the communications request message. For example, it may be the case that only devices that are authorized to request such communications may be configured to send communications request messages and/or connection request messages. Thus, the identity of the sender need not be verified. In other embodiments, the identity credential may be provided in the communication request message transmitted at 1 rather than being included in a separate connection request message transmitted at 3.

At 4, the user device 404 may (if applicable) verify the identity credential transmitted at 3. The user device 404 may be configured to utilize a publicly distributed public key associated with a credential provider (e.g., a law enforcement agency, the DMV, etc.) and/or the user device 402 identified in the connection request message to verify the identity credential contained in the connection request. For example, the public key may be previously-stored at the user device 404 and may be utilized with a digital signature included in the connection request to verify that the transmitter of the connection request is a police officer and that the information contained in the connection request has not been tampered with or modified. In some embodiments, the user device 404 may not store the public key associated with the credential provider and instead may transmit the identity credential to a credential provider computer for verification. In those, examples, the credential provider computer may verify the identity credential using the digital signature and its public key. A message may be transmitted from the credential provider computer to the user device 404 indicating that the identity credential was valid or invalid. Regardless of the verification method, if the identity credential is determined to be valid the user device 404 may provide an interface to accept or reject the connection request. In some embodiments, the interface may present any suitable portion of the verified identity information. In some embodiments, the interface may only be provided after the identity information has been verified. The interface may additionally, or alternatively provide an option to accept and/or reject the connection request.

At 5, the connection request message may be accepted (e.g., via the interface provided at the user device 404). As a result, a connection response message may be transmitted by the user device 404 to the user device 402. The connection response message may include, among other things, an indication that the connection request has been accepted.

At 6, a secure communications channel may be established between user device 402 and user device 404 via secure communications network 408 (which may be the same or a different network from the identity interrogation network 406). The user device 402 and the user device 404 may execute any suitable protocol for establishing a secure communications channel. As discussed above, a secure communications channel may include any suitable communication connection which includes a degree of certainty that third parties cannot ascertain or tamper with information exchanged via the communication connection. For example, a secure communications channel may utilize encryption techniques and public keys associated with the devices utilizing the channel such that data which is encrypted by a transmitting device may be verified by a recipient device. The secure communications channel may be part of a communications network including a near-me area network (NAN), a peer-to-peer network, a wireless network, a telecommunications network, or the like.

At 7, the user device 402 may transmit to the user device 404 an identification request via an identification request message. The identification request message may specify a specific type of identity information to which the request pertains. By way of example, the identification request message may indicate that driver's license information (or at least a portion of the driver's license information) is requested.

At 8, the user device 404 may (via selections of one or more user interface options) transmit at least a portion of an identity credential (or multiple identity credentials) associated with the user device 404 (or the user of user device 404). By way of example, the whole of the identity credential may be provided or a part of the identify credential (e.g., the driver's license number) may be provided. In some embodiments, the user may be provided an interface via the user device 404 at which the user can make a selection of the type and/or portions of the identity credential they wish to transmit. That is, the user can select what specific information and if any information at all is transmitted. In some embodiments, each portion of the identity credential may be individually digitally signed by the credential provider (and/or the transmitting user device) such that each portion of the identity credential is verifiable using the public key of the credential provider (and/or the transmitting user device). In other examples, the identity credential may include any suitable number of related identity credentials which are individually verifiable using the public key of the credential provider.

At 9, the user device 402 may verify the identity credential (or portion of the identity credential) received from user device 404. By way of example, the user device 402 may access a previously-stored public key associated with a credential provider (e.g., the DMV). Additionally, or alternatively, the user device 404 may transmit the identity credential to a credential provider associated with the identity credential for verification. The credential provider may utilize its public key to verify the identity credential and may transmit a message to the user device 402 indicating, among other things, that the identity credential is valid or invalid. Using the public key, the user device 402 may verify one or more digital signatures of the identity credential(s) received. Regardless of verification method, if the identity credential is deemed to be valid (e.g., verified), the verified identity information may be presented via the user device 402.

At 10, additional data may be exchanged between the user device 402 and the user device 404 via the secure connection. By way of example, the user of user device 404 may be provided the option to transmit any suitable information stored at the user device 404 and/or accessible to the user device 404 including. Similarly, the user of user device 402 may be provided the option to transmit any suitable information stored at the user device 404 and/or accessible to the user device 404. The information may include personal information such as vehicle registration, medical records, insurance information, vital records such as birth certificates, and the like, ticket information (e.g., traffic citations), event tickets, etc. In some embodiments, the user device 402 and the user device 404 may participate in audio and/or video communications (e.g., a FaceTime call) via the secure communications network 408. At any suitable time, the user device 402 and/or the user device 404 may terminate the secure communications channel via the application operating on the respective devices.

Figure 5:
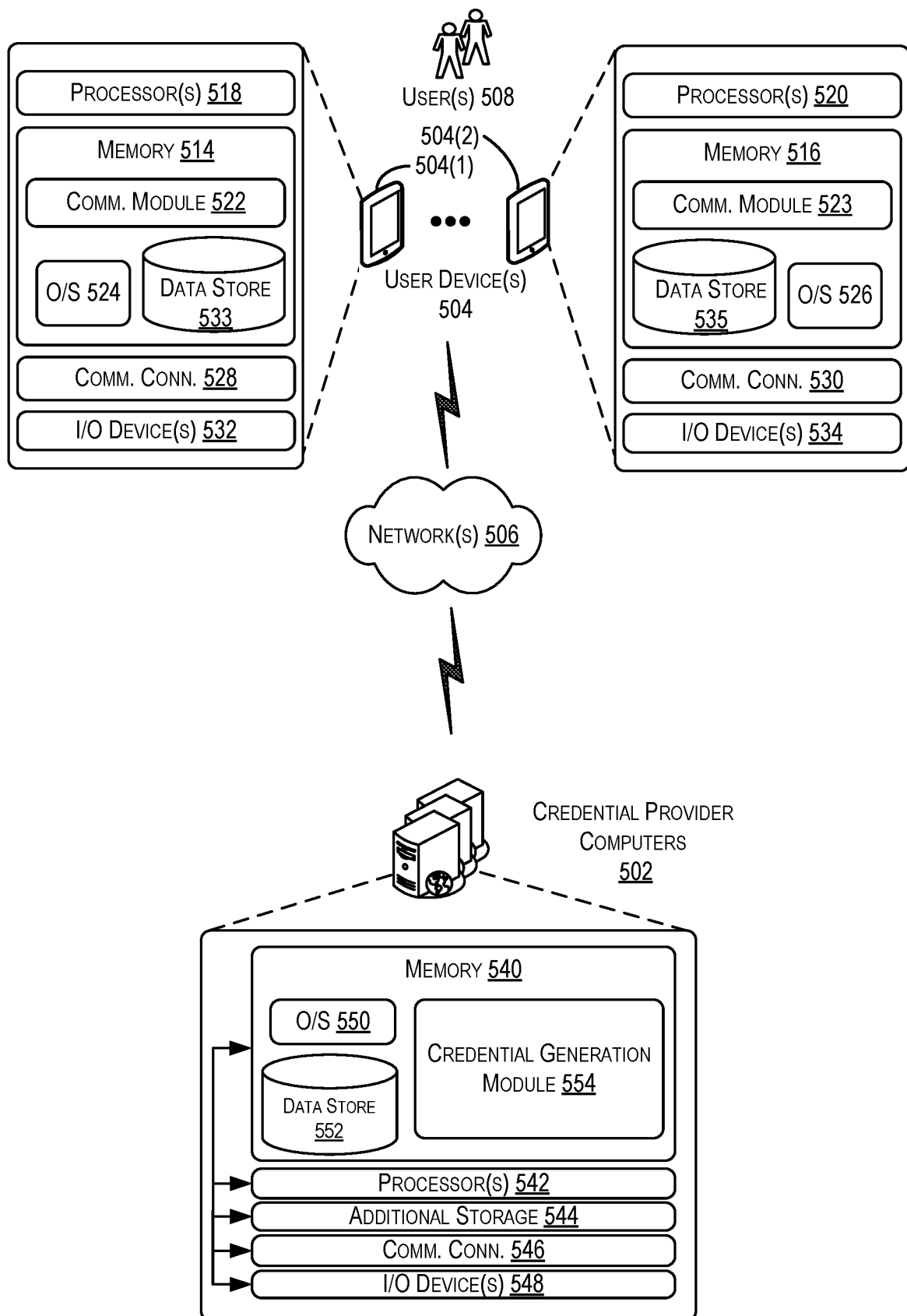
FIG. 5 is an example architecture for a system for implementing identity credential provisioning and verification techniques, in accordance with at least one embodiment.

FIG. 5 is an example architecture for a system (e.g., system 500) for implementing identity credential provisioning and verification techniques, in accordance with at least one embodiment. The system 500 may include one or more credential provider computers 502 (e.g., individual examples of the credential provider computer 302 of FIG. 3) and one or more user devices 504 connected via one or more networks 506, in accordance with at least one embodiment. In system 500, one or more users 508 (e.g., customers, users, consumers, etc.,) may utilize user computing devices 504 to access a communication module (e.g., the communication module 510 and the communication module 512 of user device 504(1) and user device 504(2), respectively. The communication modules 510 and 512 may each be provided via an application of the corresponding user device (e.g., a browser application, a digital wallet application, etc.) or a user interface (UI) accessible via the application.

The user devices 504 may include at least one memory (e.g., memory 514, memory 516) and one or more processing units or processor(s) 518/processor(s) 520. The memory 514/516 may store program instructions that are loadable and executable on the processor(s) 518 and 520, respectively, as well as data generated during the execution of these programs. Depending on the configuration and type of the user devices 504, the memory 514/516 may be volatile (such as random access memory (RAM)) and/or non-volatile (such as read-only memory (ROM), flash memory, etc.). The user devices 504 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 504. In some implementations, the memory 514/516 may include multiple different types of memory, such as static random access memory (SRAM), dynamic random access memory (DRAM), or ROM.

Turning to the contents of the memory 514/516 in more detail, the memory 514/516 may include respective operating systems (e.g., O/S 524 and O/S 526) and one or more application programs or services for implementing the features disclosed herein. Additionally, the memory 514/516 may include one or more modules for implementing the features described herein including a communications module 522/523, discussed further below in connection with FIG. 6.

The user devices 504 may also contain communication connection interface(s) (e.g., communication connection interface 528, and communication connection interface 530) that allow the user device(s) 504 to communicate with other user devices via network(s) 506 (e.g., via a Bluetooth protocol, a near-me area network protocol, a wireless network protocol, a telecommunications network protocol, and the like). The user device(s) 504 may individually include I/O device(s) (e.g., I/O devices 532, I/O devices 534, etc.), such as a keyboard, a mouse, a pen, a voice input device, a touch input device, a display, speakers, a printer, etc. In system 500, user device 504(1) may correspond to a police officer's user device and the user device 504(2) may correspond to a driver's user device in the context of the examples above.

The user devices 504 may also contain one or more data stores (e.g., the data store 533 and the data store 535). These data stores may be configured to store any suitable combination of one or more identity credentials, biometric data (e.g., an indication of a selected biometric input method, biometric information provided by the user, etc.), personal information (e.g., vehicle registration information, insurance information, etc.), an identifier (e.g., a vehicle license plate number), and/or a mapping that provides associations between any combination of the above.

The system 500 may also include one or more credential provider computer(s) 502 that may, in some examples, provide computing resources such as, but not limited to, client entities, low latency data storage, durable data store, data access, management, virtualization, hosted computing environment or "cloud-based" solutions, credential provisioning and/or maintenance, and the like. The credential provider computer(s) 502 may implement or be an example of the credential provider computer(s) described herein. The one or more credential provider computer(s) 502 may also be operable to provide site hosting, streaming services, computer application development, and/or implementation platforms, combinations of the foregoing, or the like to the one or more users 508 via user devices 504.

In some examples, the networks 506 may include any one or a combination of many different types of networks, such as cable networks, the Internet, wireless networks, peer-to-peer networks, Bluetooth networks, Bluetooth Low Energy networks, cellular networks, and other private and/or public networks. While the illustrated examples represents the users 508 communicating with the credential provider computer(s) 502 over the networks 506, the described techniques may equally apply in instances where the users 504 interact with the one or more credential provider computer(s) 502 via the one or more user devices 508 over a landline phone, via a kiosk, or in any other manner. It is also noted that the described techniques may apply in other client/server arrangements as well as in non-client/server arrangements (e.g., locally stored applications, peer-to-peer arrangements, etc.).

The one or more credential provider computer(s) 502 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more credential provider computer(s) 502 may be executed by one or more virtual machines implemented in a hosted computing environment. A hosted computing environment may also be referred to as a cloud computing environment or distributed computing environment. In some examples, the one or more credential provider computer(s) 502 may be in communication with the user devices 504 via the networks 506, or via other network connections. The one or more credential provider computer(s) 502 may include one or more servers, perhaps arranged in a cluster or as individual servers not associated with one another.

In one illustrative configuration, the one or more credential provider computer(s) 502 may include at least one memory 540 and one or more processing units or processor(s) 542. The processor(s) 542 may be implemented as appropriate in hardware, computer-executable instructions, firmware, or combination thereof. Computer-executable instruction or firmware implementations of the processor(s) 542 may include computer-executable or machine-executable instructions written in any suitable programming language to perform the various functions described when executed by a hardware computing device, such as a processor. The memory 540 may store program instructions that are loadable and executable on the processor(s) 542, as well as data generated during the execution of these programs. Depending on the configuration and type of the one or more credential provider computer(s) 502, the memory 540 may be volatile (such as RAM) and/or non-volatile (such as ROM, flash memory, etc.). The one or more credential provider computer(s) 502 or servers may also include additional storage 544, which may include removable storage and/or non-removable storage. The additional storage 544 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 540 may include multiple different types of memory, such as SRAM, DRAM, or ROM.

The memory 540, the additional storage 544, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 540 and the additional storage 544 are all examples of non-transitory computer storage media. Additional types of non-transitory computer storage media that may be present in the one or more credential provider computer(s) 502 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more credential provider computer(s) 502. Combinations of any of the above should also be included within the scope of non-transitory computer-readable media.

The one or more credential provider computer(s) 502 may also contain communication connection interface(s) 546 that allow the one or more credential provider computer(s) 502 to communicate with a data store, another computing device or server, user terminals, and/or other devices on the networks 506. The one or more credential provider computer(s) 502 may also include I/O device(s) 548, such as a keyboard, a mouse, a pen, a voice input device, a touch input device, a display, speakers, a printer, etc.

Turning to the contents of the memory 540 in more detail, the memory 540 may include an operating system 550, one or more data stores 552, and/or one or more application programs or services for implementing the features disclosed herein including the credential generation module 554. In accordance with at least one embodiment, the credential generation module 554 may be configured to maintain a user profile associated with a user, generate identity credentials using identity information as described above, distribute a public key of the credential provider to other devices, provision and provide identity credentials to other devices.

Figure 6:
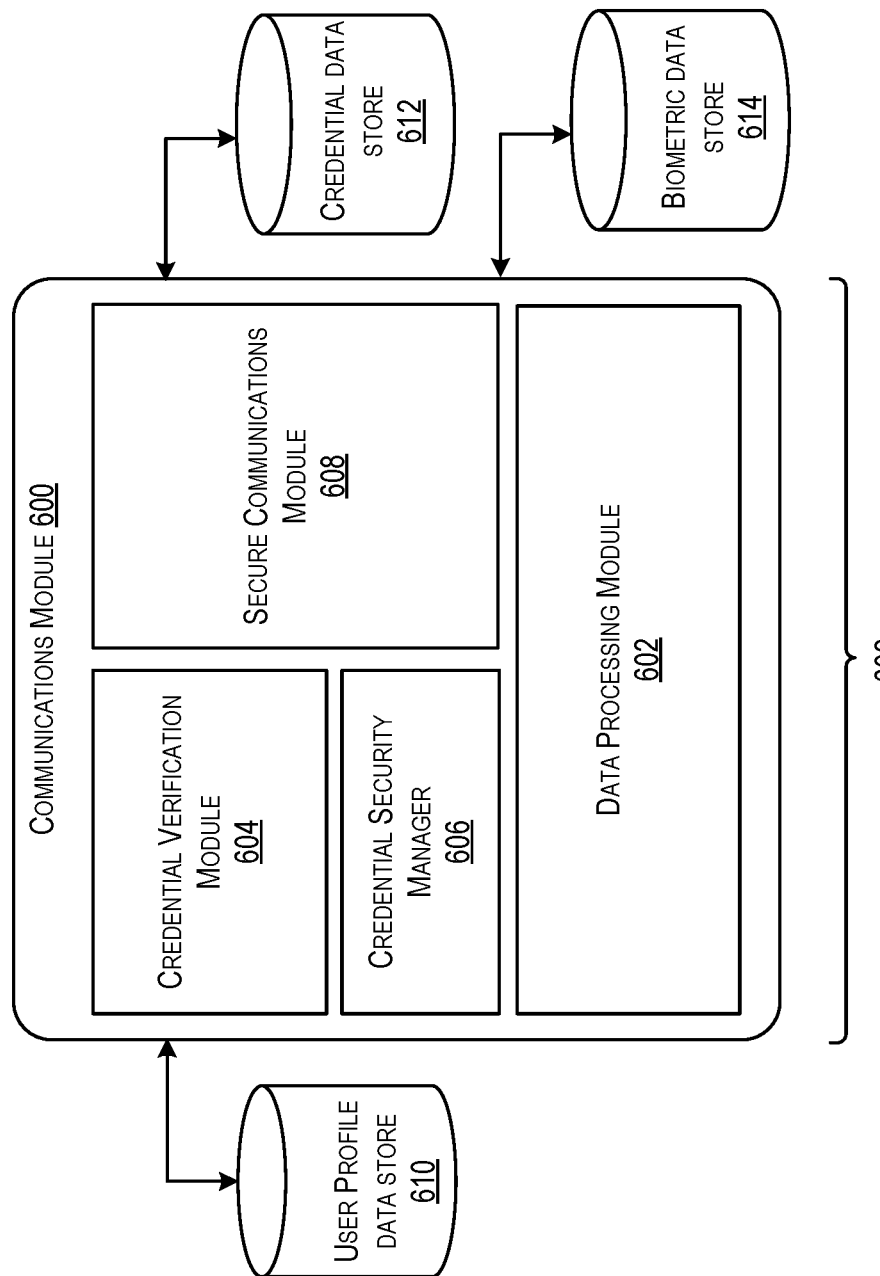
FIG. 6 illustrates in greater detail the components of an example communication module, in accordance with at least one embodiment.

FIG. 6 illustrates in greater detail the components of an example communication module 600, in accordance with at least one embodiment. Communications module 600 may be an example of the communications modules 522 and 523 of FIG. 5. As shown, the example embodiment includes a number of modules including, but not limited to a data processing module 602, a credential verification module 604, a credential security manager 606, and a secure communications module 608. It should be appreciated that each module of FIG. 6 may be executed on a single computer, and or each component, or sets of components may be executed on separate computers. The modules/engines of FIG. 6 may be communicatively coupled to the data stores 610, 612, and 614 such that data may be exchanged between the modules/ engines and the data stores. It should be appreciated that any combination of the data stores 610, 612, and/or 614 may be provided by the data store 533 and/or 535 of FIG. 5.

In at least one embodiment, the data processing module 602 includes an application programming interface. Generally, the application programming interface may be utilized to receive and/or provide any suitable information to and/or from the communications module 600 (or modules of the communications module 600) with respect to any of the examples provided herein. In some embodiments, the data processing module 602 may be configured to provide any suitable interface(s) discussed above including, but not limited to, interface(s) for obtaining an identifier to be associated with an identity credential, interface(s) for requesting/accepting/rejecting communications channels, interface(s) for associating additional data (e.g., documents) with an identity credential, interface(s) for selecting particular identity credential(s) or portions of identity credential(s) to be transmitted, interfaces to transmit any suitable information such as ticket information, personal information, or the like, interfaces to establish or terminate a secure communications channel, and the like.

The data processing module 602 may be configured to obtain and/or receive identity credentials from a credential provider computer (e.g., the credential provider computer (e.g., the credential provider computers 502 of FIG. 5). In some embodiments, the data processing module 602 may obtain/receive and store (e.g., within a user profile associated with a user and stored at the user profile data store 610) documents including personal information, medical records, vital statistics records, insurance information, or any suitable information provided by the user. The data processing module 602 may further be configured to store one or more identity credentials at the credential data store 612. The data processing module 602 be configured to store biometric data (e.g., an indication of the biometric input method used during the provisioning process of an identity credential and biometric information such as fingerprint scan(s), iris scan(s), retina scan(s), voice recordings, images of a user, etc.) received with the identity credential or embedded in the identity credential. Accordingly, the data processing module 602 may be configured to extract embedded biometric data from a received identity credential. The data processing module 602 may further be configured to maintain a mapping and/or association information that maintains associations between any suitable combination of the documents/additional data stored at the user profile data store 610, identity credentials within the credential data store 612, and/or biometric data for the identity credential. In still further examples, the data processing module 602 may be configured to receive one or more public keys associated with one or more respective credential providers. These public keys may be stored at, for example, the user profile data store 610 for later use.

The data processing module 602 may be configured to receive any suitable message including an identifier (e.g., a license plate identifier or any suitable identifier associated with the user). The data processing module 602 may determine that the identifier in the message either matches, or does not match, a stored identifier (e.g., stored in the user profile data store 610). If the identifiers match, the data processing module 602 may be configured to perform additional operations. However, if the identifiers do not match, the data processing module 602 may be configured to discard the message.

In some embodiments, the credential verification module 604 may be configured to receive and/or transmit an identity credential. An identity credential may be received and/or transmitted via any suitable message. Upon receipt, the credential verification module 604 may be configured to utilize a previously-stored public key associated with the credential provider of the received identity credential. Using the public key and a digital signature (or more than one digital signature) of the identity credential, the credential verification module 604 may verify that the identity credential was issued by the credential provider and that the data within the identity credential has not been modified. The credential verification module 604 may stimulate the data processing module 602 to provide one or more interfaces depending on the verification outcome (e.g., valid or invalid). In some embodiments, the credential verification module 604 may send the identity credential to a credential provider computer for verification and receive a response from the credential provider computer indicating that the identity credential is valid or invalid.

The credential security manager 606 may be configured to enforce access restrictions to the identity credential(s) stored at the credential data store 612. By way of example, the credential security manager 606 be stimulated (e.g., upon receiving a connections request message and/or a communications request message) to obtain user input (e.g., biometric input provided at the user device). By way of example, prior to providing access to an identity credential for transmission purposes or otherwise, the credential security manager 606 may provide an interface which presents a number of biometric input method options. The credential security manager 606 may receive user input indicating a selection of a particular biometric input method.

In some embodiments, the credential security manager 606 may determine whether the biometric input method selected matches a biometric input method used during the provisioning process of the identity credential. If the input methods match, the credential security manager 606 may cause the user to be prompted for biometric information (e.g., a fingerprint, facial image, iris scan, retina scan, voice command, or any suitable biometric information corresponding to the selected biometric input method). The user may enter his biometric information at the user device using any appropriate means. Upon receipt of the biometric information, the credential security manager 606 may verify that the received biometric information matches the biometric information stored at the biometric data store 614 and associated with the identity credential. In some embodiments, only when the biometric input methods match and the biometric information match will access to the identity credential be allowed. Accordingly, a user be required to have knowledge of what input method was used to secure the identity credential as well as providing the proper biometric information before he would be allowed access to his identity credential.

The secure communications module 608 may be configured to perform any suitable operations for establishing a secure communications channel with another user device. The secure communications module 608 may execute any suitable protocol for establishing a secure communications channel. As discussed above, a secure communications channel may include any suitable communication connection which includes a degree of certainty that third parties cannot ascertain or tamper with information exchanged via the secure communication connection. In some embodiments, the secure communications module 608 may utilize encryption techniques and public keys associated with the devices utilizing the channel such that data which is encrypted by a secure communications module 608 may be verified by a recipient device. The secure communications channel may be part of a communications network including a near-me area network (NAN), a wireless network, a telecommunications network, or the like.

Figure 7:
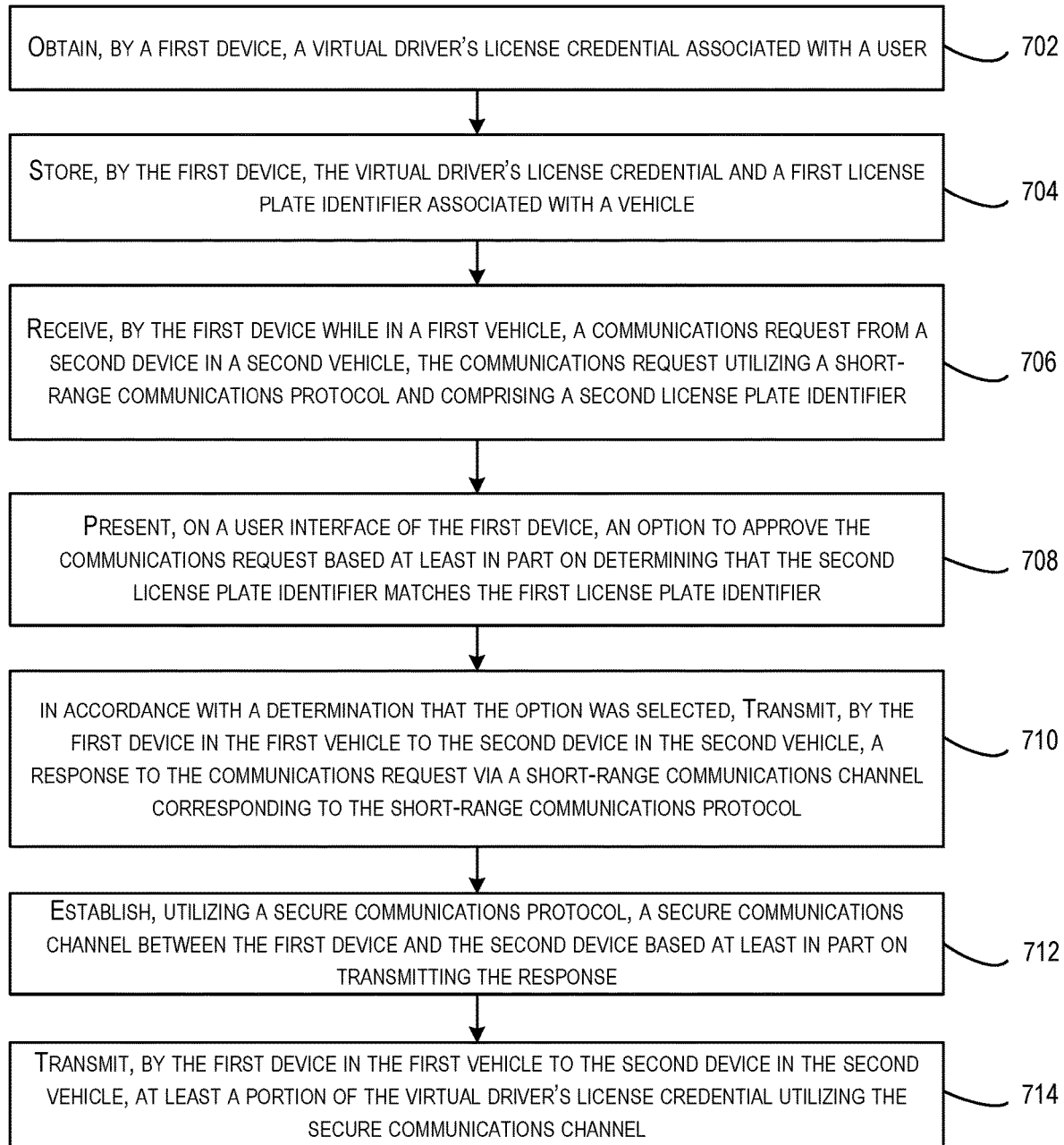
FIG. 7 is a flowchart illustrating an example method for providing secure data transfers, in accordance with at least one embodiment.

FIG. 7 is a flowchart illustrating an example method 700 for providing secure data transfers, in accordance with at least one embodiment. The method 700 may be performed by one or more components of the communications module 600 of FIG. 6. The method 700 may performed in any suitable order. It should be appreciated that the method 700 may include a greater number or a lesser number of operations than those depicted in FIG. 7 and that the operations may be performed in any suitable order.

The method may begin at 702, where a virtual driver's license credential (e.g., an identity credential) may be obtained (e.g., by the data processing module 602 of FIG. 6). The virtual driver's license credential may be associated with a user (or the user's device). In some embodiments, the virtual driver's license credential may be provisioned and provided by a trusted entity such as the Department of Motor Vehicles or any suitable government agency. The virtual driver's license credential may be digitally signed by the credential provider (e.g., the DMV) using a public key associated with the credential provider. In some embodiments, the virtual driver's license credential may be additionally or alternatively digitally signed by the user's utilizing a public key associated with the user's device.

At 704, the virtual driver's license credential and a first license plate identifier associated with a vehicle may be stored by the first device. In some embodiments, the data processing module 602 may obtain the license plate identifier via user input entered at a user device.

At 706, a communications request may be received by the first device (e.g., by in the first vehicle from a second device in a second vehicle, the communications request may utilize a short-range communications protocol and comprising a second license plate identifier. The short-range communications protocol any suitable short-range communications protocol (e.g., Bluetooth Low Energy, iBeacon, etc.).

At 706, a user interface of the first device may be utilized to present (e.g., by the data processing module 602) an option to approve the communications request based at least in part on determining (e.g., by the data processing module 604) that the second license plate identifier matches the first license plate identifier.

At 708, in accordance with a determination (e.g., by the data processing module 602) that the option was selected, the first device in the first vehicle may transmit to the second device in the second vehicle, a response to the communications request via a short-range communications channel corresponding to the short-range communications protocol.

At 710, a secure communications channel may be established (e.g., by the secure communications module 608 of FIG. 6) between the first device and the second device based at least in part on transmitting the response. In some embodiments, the secure communications channel may utilize a secure communications protocol maintained by the secure communications module 608).

At 712, at least a portion of the virtual driver's license credential may be transmitted (e.g., by the secure communications module 608) by the first device in the first vehicle to the second device in the second vehicle. The transmission may utilize the secure communications channel.

Figure 8:
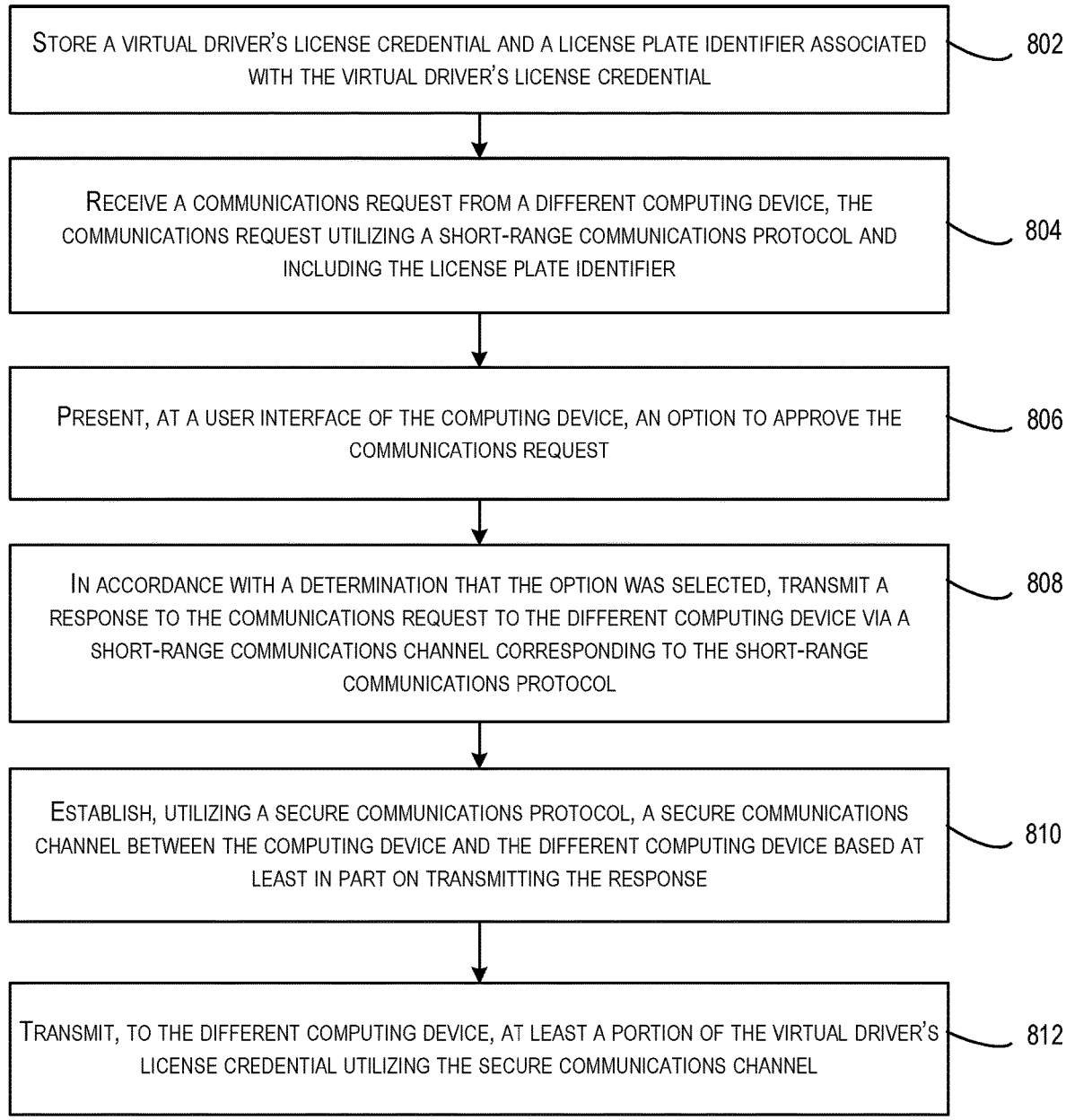
FIG. 8 is a flowchart illustrating another example method for providing secure data transfers, in accordance with at least one embodiment.

FIG. 8 is a flowchart illustrating another example method 800 for providing secure data transfers, in accordance with at least one embodiment. The method 800 may be performed by one or more components of the communications module 600 of FIG. 6. The method 800 may performed in any suitable order. It should be appreciated that the method 800 may include a greater number or a lesser number of operations than that depicted in FIG. 8 and that the operations may be performed in any suitable order.

The method may begin at 802, where a virtual driver's license credential and a license plate identifier associated with the virtual driver's license credential may be stored. In some examples, the virtual driver's license credential may be stored in any suitable data store (e.g., credential data store 612 of FIG. 6). In some embodiments, the license plate identifier may be stored as part of a user profile within the user profile data store 610.

At 804, a communications request may be received (e.g., by the data processing module 602) from a different computing device. In some embodiments, the communications request may utilize a short-range communications protocol. In still further embodiments, the communications request may include the license plate identifier;

At 806, an option may be presented (e.g., by the data processing module 602) at a user interface of the computing device. The option may be utilized to approve the communications request.

At 808, in accordance with a determination that the option was selected, a response to the communications request may be transmitted (e.g., by the data processing module 602) to the different computing device via a short-range communications channel corresponding to the short-range communications protocol.

At 810, a secure communications channel between the computing device and the different computing device may be established (e.g., using, at least in part, the secure communications module 608) utilizing a secure communications protocol. The secure communication channel may be established based at least in part on transmitting the response.

At 812, at least a portion of the virtual driver's license credential may be transmitted (e.g., by the secure communications module 608) to the different computing device utilizing the secure communications channel.

Figure 9:
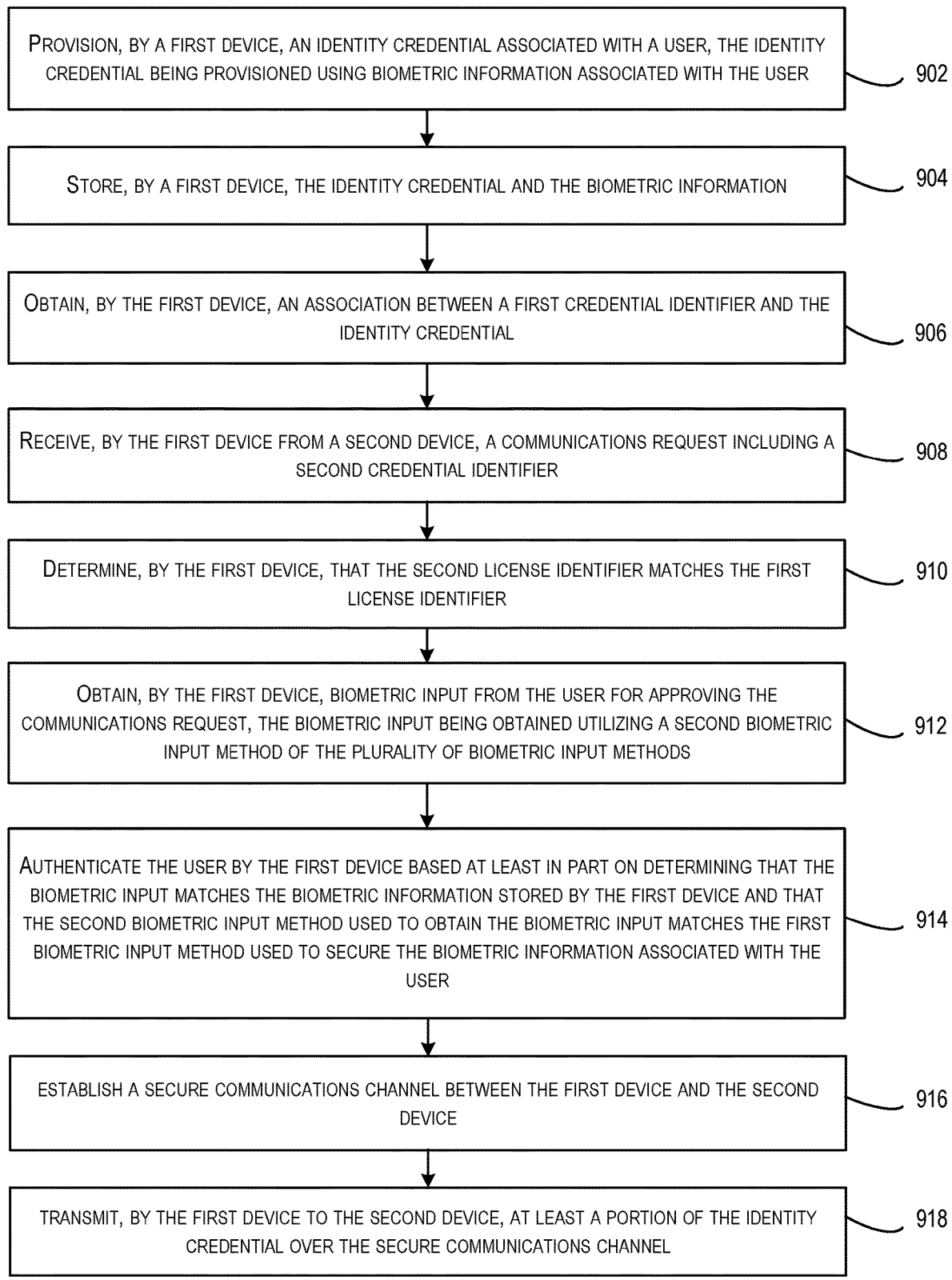
FIG. 9 is a flowchart illustrating an example method for authenticating a user, in accordance with at least one embodiment.

FIG. 9 is a flowchart illustrating an example method 900 for authenticating a user, in accordance with at least one embodiment. The method 900 may be performed by one or more components of the communications module 600 of FIG. 6. The method 900 may performed in any suitable order. It should be appreciated that the method 900 may include a greater number or a lesser number of operations than that depicted in FIG. 9 and that the operations may be performed in any suitable order.

The method may begin at 902, where an identity credential associated with a user may be obtained by a first device. In some embodiments, the identity credential may be provisioned (e.g., by an identity credential provider) using biometric information associated with the user. In some embodiments, the biometric information may be obtained using a first biometric input method of a plurality of biometric input methods.

At 904, the identity credential and the biometric information may be stored at the first device. For example, the identity credential may be stored at the credential data store 610 of FIG. 6 and the biometric information may be stored at the biometric data store 612 of FIG. 6.

At 906, an association between a first credential identifier (e.g., a license plate number) and the identity credential may be obtained by the first device (e.g., by the data processing module 602) of FIG. 6).

At 908, a communications request may be received by the first device (e.g., utilizing the data processing module 602) from a second device. In some embodiments, the communications request may include a second credential identifier (e.g., another license plate number). The second credential identifier may have been provided via user input inputted at the second device.

At 910, the first device may determine (e.g., utilizing the data processing module 602) that the second credential identifier matches the first credential identifier. If the first license identifier and the second license identifier do not match, the communications request may be discarded and no further processing conducted.

At 912, biometric input may be obtained by the first device (e.g., utilizing the data processing module 602) from the user. The biometric input may be associated with approving the communications request. In some embodiments, the biometric input obtained may utilize a second biometric input method of the plurality of biometric input methods.

At 914, the user may be authenticated by the first device (e.g., utilizing the credential security module 608 of FIG. 6) based at least in part on determining that the biometric input matches the biometric information stored by the first device and that the second biometric input method used to obtain the biometric input matches the first biometric input method used to secure the biometric information associated with the user.

At 916, in response to authenticating the user, a secure communications channel may be established (e.g., at least in part by the secure communications module 608) between the first device and the second device.

At 918, at least a portion of the license credential may be transmitted by the first device (e.g., utilizing the secure communications module 608) to the second device. In some embodiments, the portion of the identity credential may be transmitted over the secure communications channel.

Figure 10:
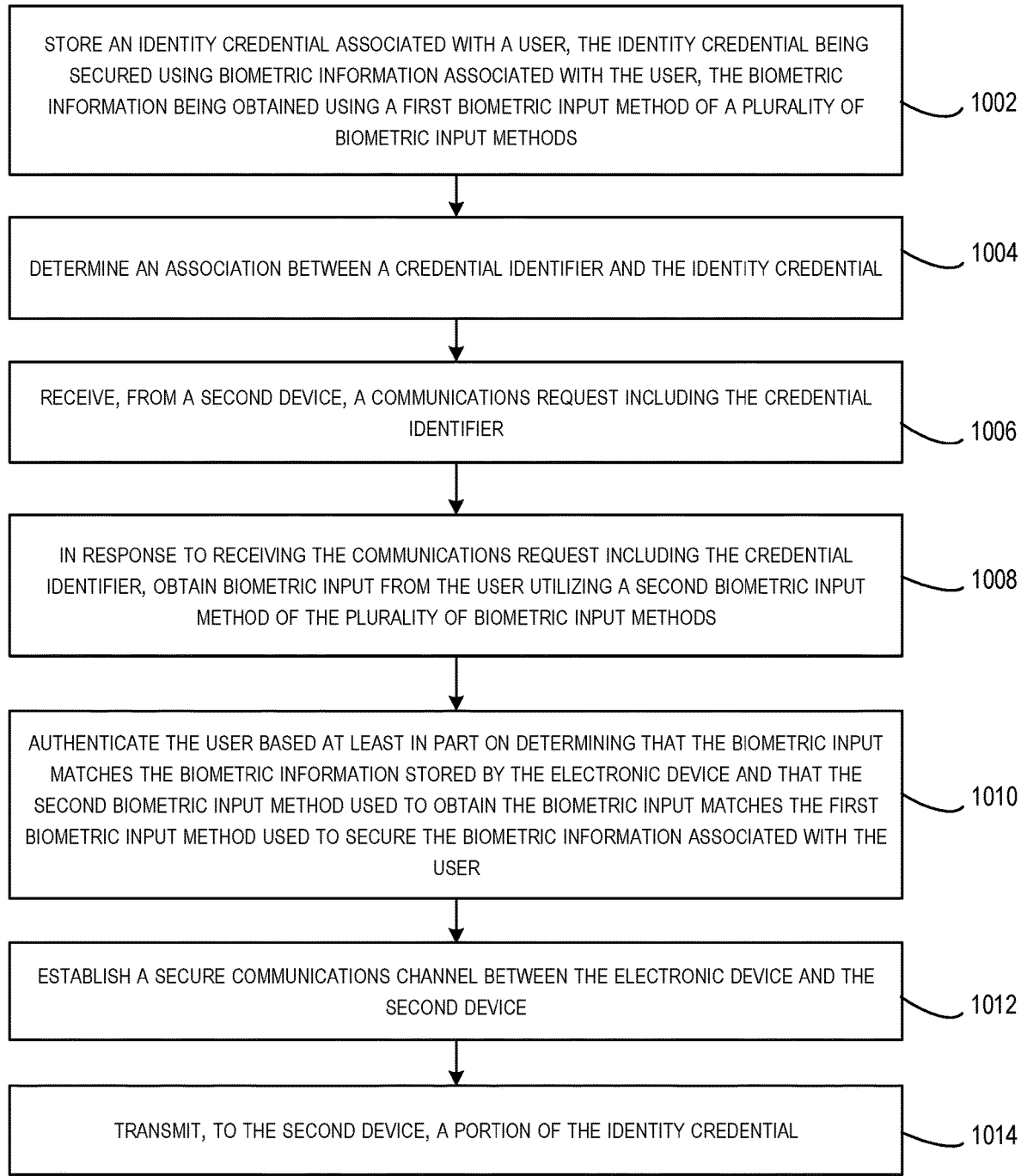
FIG. 10 is a flowchart illustrating another example method for authenticating a user, in accordance with at least one embodiment.

FIG. 10 is a flowchart illustrating another example method 1000 for authenticating a user, in accordance with at least one embodiment. The method 1000 may be performed by an electronic device (e.g., a user device as described above) and by one or more components of the communications module 600 of FIG. 6 operating on the electronic device. The method 1000 may performed in any suitable order. It should be appreciated that the method 1000 may include a greater number or a lesser number of operations than that depicted in FIG. 10 and that the operations may be performed in any suitable order.

The method may begin at 1002, where an identity credential (e.g., a credential associated with a driver's license and/or a passport) associated with a user may be stored. In some embodiments, the identity credential may be secured (e.g., by an identity credential provider) using biometric information associated with the user. In some embodiments, the biometric information may be obtained using a first biometric input method of a plurality of biometric input methods.

At 1004, an association between a credential identifier and the identity credential may be determined (e.g., by the data processing module 602 of FIG. 6).

At 1006, a communications request (e.g., via a communications request message) may be received (e.g., utilizing the data processing module 602) from a second device. In some embodiments, the communications request may include the credential identifier.

At 1008, in response to receiving the communications request, biometric input may be obtained by the first device (e.g., utilizing the data processing module 602) from the user. The biometric input may be associated with approving the communications request. In some embodiments, the biometric input obtained may utilize a second biometric input method of the plurality of biometric input methods.

At 1010, the user may be authenticated by the first device (e.g., utilizing the credential security module 608 of FIG. 6) based at least in part on determining that the biometric input matches the biometric information stored by the electronic device and that the second biometric input method used to obtain the biometric input matches the first biometric input method used to secure the biometric information associated with the user.

At 1012, a secure communications channel may be established (e.g., at least in part by the secure communications module 608) between the electronic device and the second device.

At 1014, at least a portion (e.g., some attributes, all the attributes) of the identity credential may be transmitted by the first device (e.g., utilizing the secure communications module 608) to the second device. In some embodiments, the portion of the identity credential may be transmitted over the secure communications channel.

The specification and drawings are to be regarded in an illustrative rather than a restrictive sense. It will, however, be evident that various modifications and changes may be made thereunto without departing from the broader spirit and scope of the disclosure as set forth in the claims.

Illustrative methods, computer-readable medium, and systems for providing various techniques for communicating credential information are described above. Some or all of these systems, media, and methods may, but need not, be implemented at least partially by architectures and flows such as those shown at least in FIGS. 1-10 above. It should be understood that any of the above techniques can be used within any type of application operating at an accessory device or a host device. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user devices which can be used to operate any of a number of applications. User devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art (except for transitory media like carrier waves or the like) such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, as noted above, computer-readable storage media does not include transitory media such as carrier waves or the like.

As described above, one aspect of the present technology provides credentials and/or credential-related information via messages. The present disclosure contemplates that in some instances, this gathered data may include personal information data that uniquely identifies or can be used to contact or locate a specific person utilizing the credential information. The present disclosure recognizes that the use of such personal information data, in the present technology, can be used to the benefit of users. For example, the credential and/or credential information can be used to provide an efficient and user-friendly way to prove and/or verify a person's identity.

The present disclosure contemplates that the entities responsible for the collection, analysis, disclosure, transfer, storage, or other use of such personal information data (e.g., credential and/or credential information) will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. Hence different privacy practices should be maintained for different personal data types in each country.

Despite the foregoing, the present disclosure also contemplates embodiments in which users selectively block the use of, or access to, credential and/or credential information. That is, the present disclosure contemplates that hardware and/or software elements can be provided to prevent or block access to such personal information data. For example, in some embodiments, the user may opt out of performing the pairing procedures and/or data connection procedures discussed herein. In addition to providing "opt in" and "opt out" options, the present disclosure contemplates providing notifications relating to the access or use of personal information.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. De-identification may be facilitated, when appropriate, by removing specific identifiers, controlling the amount or specificity of data stored, controlling how data is stored, and/or other methods.

Therefore, although the present disclosure broadly covers use of personal information data to implement one or more various disclosed embodiments, the present disclosure also contemplates that the various embodiments can also be implemented without the need for accessing such personal information data.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims), are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise be read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, by a first device, a virtual driver's license credential associated with a user, wherein the virtual driver's license credential is issued by a certification authority, and wherein the virtual driver's license credential is digitally signed with a key associated with the certification authority, wherein the key is generated at least in part on biometric information associated with the user;
   storing, by the first device, the virtual driver's license credential associated with the user and a license plate identifier of the user, the license plate identifier associated with a vehicle;
   receiving, by the first device in a first vehicle and from a second device in a second vehicle, a request to establish a secure communications channel for sharing the virtual driver's license credential of the user, the request utilising a short-range communications protocol and including the license plate identifier of the user;
   presenting, on a user interface of the first device, an option to approve the request to establish the secure communications channel for sharing the virtual driver's license credential of the user based at least in part on a comparison of the stored license plate identifier and the received license plate identifier for the vehicle that was received in the request to establish the secure communications channel;
   in accordance with a determination that the option was selected, transmitting, by the first device in the first vehicle to the second device in the second vehicle, a response to the request via a short-range communications channel corresponding to the short-range communications protocol;
   establishing, utilizing a secure communications protocol, a secure communications channel between the first device and the second device based at least in part on the response; and
   transmitting, by the first device in the first vehicle to the second device in the second vehicle, at least a portion of the virtual driver's license credential utilizing the secure communications channel, wherein the at least the portion of the virtual driver's license credential is verified at the second device.

2. The computer-implemented method of claim 1, further comprising:
   obtaining, by the first device, one or more documents to be associated with the virtual driver's license credential;
   storing, by the first device, the one or more documents as being associated with the virtual driver's license credential; and
   providing, on the user interface of the first device, a transmit option related to transmitting the one or more documents to the second device via the secure communications channel.

3. The computer-implemented method of claim 2, wherein the one or more documents comprise at least one of: a vehicle insurance document or a vehicle registration document.

4. The computer-implemented method of claim 1, wherein the virtual driver's license credential comprises at least one of a driver's license number, a first name, a last name, a street address, a city, a state, a zip code, an eye color, a hair color, a height, a weight, a date of birth, or an expiration date.

5. The computer-implemented method of claim 1, further comprising:
receiving, by the first device in the first vehicle from the second device in the second vehicle, an identification credential associated with a second user of the second vehicle;
verifying, at the first device, an identity of the second user of the second vehicle based at least in part on the identification credential;
presenting, on the user interface of the first device, an additional option to approve the secure communications channel being established based at least in part on the identity of the second user of the second vehicle being verified; and
receiving an indication that the additional option was selected, wherein establishing the secure communications channel between the first device and the second device is further based at least in part on the indication that the additional option was selected.

6. The computer-implemented method of claim 5, further comprising:
storing, at the first device, a mapping identifying a plurality of identification credentials associated with a plurality of law enforcement entities, wherein identity of the second user of the second vehicle is verified using the identification credential associated with the second user of the second vehicle and the mapping.

7. The computer-implemented method of claim 1, further comprising receiving, by the first device in the first vehicle and from the second device in the second vehicle, information associated with a traffic stop via the secure communications channel.

8. The computer-implemented method of claim 7, wherein the information associated with the traffic stop includes a warning or a traffic ticket.

9. A computing device, comprising:
a processor; and
a memory storing computer-readable instructions that, upon execution by the processor, configure the computing device to:
store a virtual driver's license credential of a user and a license plate identifier of the user, the license plate identifier associated with the virtual driver's license credential, the virtual driver's license credential being issued by a certification authority and digitally signed with a key associated with the certification authority, wherein the key is generated based at least in part on biometric information associated with the user;
receive a request, from a different computing device, to establish a secure communications channel for sharing the virtual driver's license credential of the user, the request utilizing a short-range communications protocol and including the license plate identifier of the user;
present, at a user interface of the computing device, an option to approve the request to establish the secure communications channel for sharing the virtual driver's license credential of the user based at least in part on a comparison of the stored license plate identifier of the user and the received license plate identifier for a vehicle, the received license plate identifier being received in the request to establish the secure communications channel;
in accordance with a determination that the option was selected, transmit a response to the request to the different computing device via a short-range communications channel corresponding to the short-range communications protocol;
establish, utilizing a secure communications protocol, a secure communications channel between the computing device and the different computing device based at least in part on the response; and
transmit, to the different computing device, at least a portion of the virtual driver's license credential utilizing the secure communications channel, wherein the at least the portion of the virtual driver's license credential is verified at the different computing device.

10. The computing device of claim 9, wherein the virtual driver's license credential of the user is associated with a plurality of license plate identifiers including the stored license plate identifier of the user and at least one other license plate identifier of the user stored on the computing device.

11. The computing device of claim 9, wherein the short-range communications protocol corresponding to the short-range communications channel is a Bluetooth protocol.

12. The computing device of claim 9, wherein the secure communications protocol comprises one of a near-me area network (NAN) protocol, a wide area network (WAN) protocol, a wireless direct link protocol, or a wireless communications protocol.

13. The computing device of claim 9, wherein the processor is further configured to execute the computer-readable instructions to at least:
receive, from the different computing device, an identification credential associated with a different user of the different computing device;
provide, to a server computer, the identification credential associated with the different user of the different computing device;
receive, from the server computer, an indication that an identity of the different user of the different computing device is verified;
present, on the user interface of the computing device, an additional option to approve the secure communications channel being established based at least in part on the identity of the different user of the different computing device being verified; and
receive an indication that the additional option was selected, wherein establishing the secure communications channel between the computing device and the different computing device is further based at least in part on the indication that the additional option was selected.

14. A non-transitory computer-readable storage medium having stored thereon computer-executable instructions that, when executed by a processor, cause the processor to perform operations comprising:
storing a virtual driver's license credential associated with a user and a license plate identifier of the user, the license plate identifier associated with the virtual driver's license credential, the virtual driver's license credential being issued by a certification authority and digitally signed with a key associated with the certification authority, wherein the key is generated based at least in part on biometric information associated with the user;

receiving, from a different computing device, a request to establish a secure communications channel for sharing the virtual driver's license credential associated with the user, the request utilizing a short-range communications protocol and comprising the license plate identifier of the user;

presenting, at a user interface, an option to approve the request to establish the secure communications channel for sharing the virtual driver's license credential associated with the user based at least in part on a comparison of the stored license plate identifier and a known license plate identifier for a vehicle that was received in the request to establish the secure communications channel;

in accordance with a determination that the option was selected, transmitting a response to the request to the different computing device via a short-range communications channel corresponding to the short-range communications protocol;

establishing, utilizing a secure communications protocol, a secure communications channel with the different computing device based at least in part on the response; and transmitting, to the different computing device, at least a portion of the virtual driver's license credential utilizing the secure communications channel, wherein the at least the portion of the virtual driver's license credential is verified at the different computing device.

15. The non-transitory computer-readable storage medium of claim 14, wherein executing the computer-executable instructions by a processor, further causes the processor to perform operations comprising:

storing one or more additional documents associated with the virtual driver's license credential;

receiving an indication that a subset of the one or more additional documents are to be transmitted to the different computing device; and transmitting, via the secure communications channel, the subset of the one or more additional documents associated with the virtual driver's license credential.

16. The non-transitory computer-readable storage medium of claim 14, wherein executing the computer-executable instructions by a processor, further causes the processor to perform operations comprising exchanging at least one of audio data or video data with the different computing device utilizing the secure communications channel.

17. The non-transitory computer-readable storage medium of claim 14, wherein executing the computer-executable instructions by a processor, further causes the processor to perform operations comprising:

receiving, from the different computing device, supplemental data via the secure communications channel; and presenting the supplemental data on the user interface.

18. The non-transitory computer-readable storage medium of claim 17, wherein executing the computer-executable instructions by a processor, further causes the processor to perform operations comprising:

providing, on the user interface, an acknowledgement option for acknowledging receipt of the supplemental data; and in accordance with identifying that the acknowledgement option has been selected, transmitting, to the different computing device, an acknowledgement indication associated with the supplemental data.

19. The non-transitory computer-readable storage medium of claim 14, wherein executing the computer-executable instructions by a processor, further causes the processor to perform operations comprising:

receiving a closing request to close the secure communications channel; and closing the secure communications channel in response to receiving the closing request.

\* \* \* \* \*

UNITED STATES PATENT AND TRADEMARK OFFICE
CERTIFICATE OF CORRECTION

| | |
|---|---|
| PATENT NO. | : 11,093,597 B2 |
| APPLICATION NO. | : 16/122321 |
| DATED | : August 17, 2021 |
| INVENTOR(S) | : Achim Pantfoerder et al. |

It is certified that error appears in the above-identified patent and that said Letters Patent is hereby corrected as shown below:

In the Claims
Claim 1, Column 32, Line 30, delete "utilising a short-range" and insert --utilizing a short-range--

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*